(12) United States Patent
Kaminski et al.

(10) Patent No.: US 6,744,967 B2
(45) Date of Patent: Jun. 1, 2004

(54) PROGRAM POSITION USER INTERFACE FOR PERSONAL VIDEO RECORDING TIME SHIFT BUFFER

(75) Inventors: Dariusz S. Kaminski, Atlanta, GA (US); Robert O. Banker, Cumming, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 10/034,028

(22) Filed: Dec. 20, 2001

(65) Prior Publication Data

US 2003/0121055 A1 Jun. 26, 2003

(51) Int. Cl.[7] .................................................. H04N 5/91
(52) U.S. Cl. ........................ 386/46; 386/125; 345/440.2
(58) Field of Search ................................ 386/1, 45, 83, 386/125–126; 348/563; 725/37, 41, 52, 55; 360/15, 27, 55, 57, 60, 72.2, 79, 65; 345/440.2, 716

(56) References Cited

U.S. PATENT DOCUMENTS

| | | | |
|---|---|---|---|
| 4,706,121 A | | 11/1987 | Young |
| 4,908,713 A | | 3/1990 | Levine |
| 4,963,994 A | | 10/1990 | Levine |
| 5,253,066 A | | 10/1993 | Vogel |
| 5,293,357 A | | 3/1994 | Hallenbeck |
| 5,357,276 A | * | 10/1994 | Banker et al. ................ 725/37 |
| 5,361,173 A | * | 11/1994 | Ishii et al. ..................... 360/65 |
| 5,371,551 A | | 12/1994 | Logan et al. |
| 5,477,262 A | | 12/1995 | Banker et al. |
| 5,479,268 A | | 12/1995 | Young et al. |
| 5,488,409 A | * | 1/1996 | Yuen et al. .................... 386/83 |
| 5,508,815 A | | 4/1996 | Levine |
| 5,568,272 A | | 10/1996 | Levine |
| 5,809,204 A | | 9/1998 | Young et al. |
| 5,915,068 A | | 6/1999 | Levine |
| RE36,801 E | | 8/2000 | Logan et al. |
| 6,151,059 A | * | 11/2000 | Schein et al. ................. 725/37 |
| 6,498,895 B2 | * | 12/2002 | Young et al. .................. 386/83 |

OTHER PUBLICATIONS

Scientific–Atlanta, Inc. Pending application Ser. #10/015, 349, Atty. Docket #A–7279, filed Dec. 11, 2001, Title: "Controlling Personal Video Recording Functions from Interactive Television," Inventors: Mark E. Schutte and Valerie G. Gutknecht.

Scientific–Atlanta, Inc. Pending application Ser. #10/102, 043, Atty. Docket #A–7484, filed Mar. 20, 2002, Title: "Composite Buffering," Inventors: John Eric West and Arturo A. Rodriguez.

Scientific–Atlanta, Inc. Pending application Ser. #10/143, 123, Atty. Docket #A–7315, filed May 10, 2002, Title: "Channel Buffering and Display Management System for Multi–Tuner Set–Top Box," Inventors: Arturo A. Rodriguez and Ramesh Nallur.

Scientific–Atlanta, Inc. Pending application Ser. #10/143, 647, Atty. Docket #A–8142, filed May 10, 2002, Title: "Managing Time Shift Buffers," Inventors; Dariusz S. Kaminski, Arturo A. Rodriguez, Robert O. Banker and Valerie G. Gutknecht.

* cited by examiner

*Primary Examiner*—Thai Tran
*Assistant Examiner*—Christopher Onuaku

(57) ABSTRACT

A system that provides information about media content stored in a storage device coupled to an interactive media services client device. In one embodiment, the system includes a memory with logic, and a processor configured with the logic to provide a symbol that represents the duration of at least one media content instance of a plurality of media content instances stored in the storage device. Preferably, the processor is further configured with the logic to provide a recorded portion in the symbol that represents the portion of the media content instance that is accessible to a user.

46 Claims, 15 Drawing Sheets

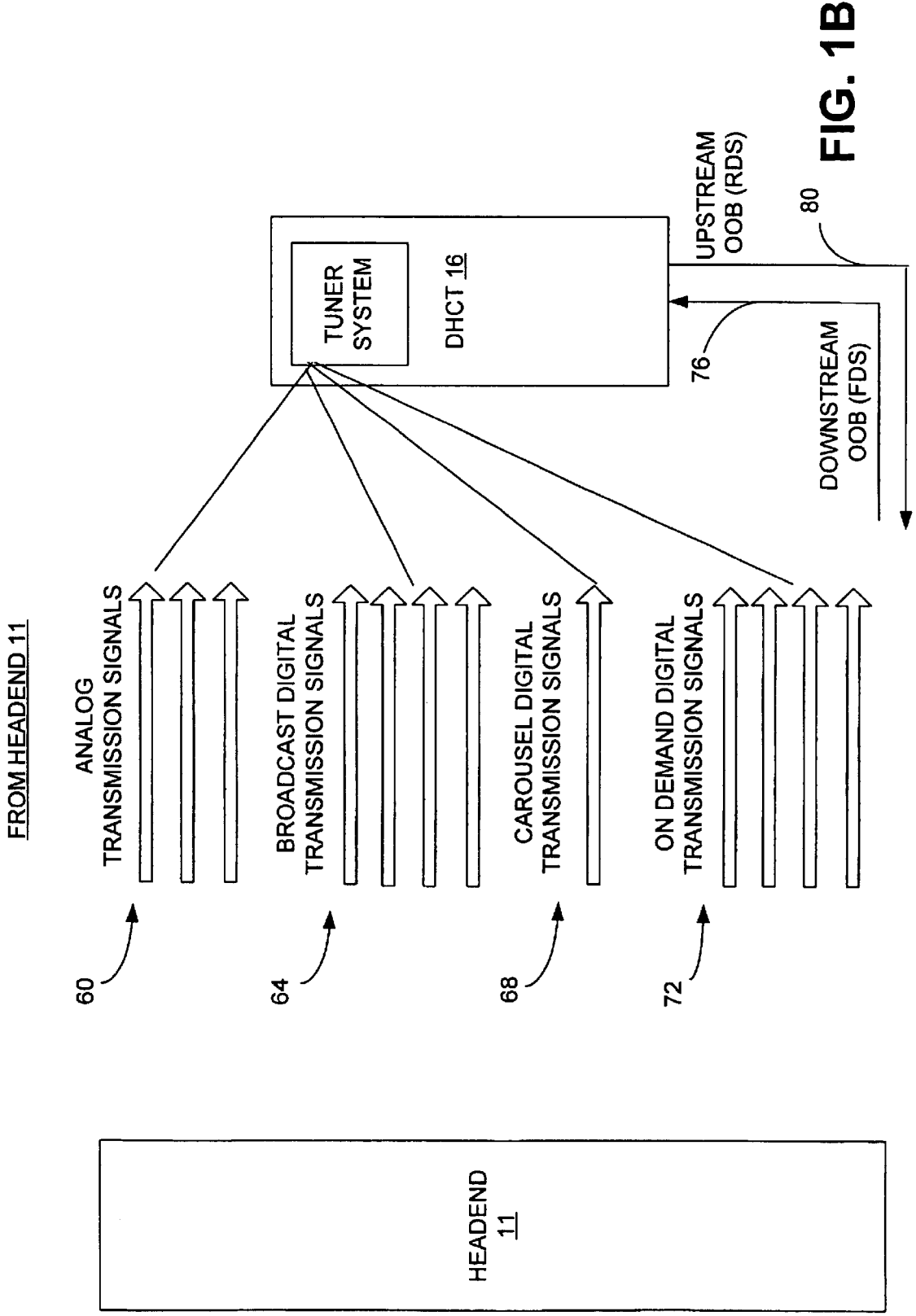

US 6,744,967 B2

PROGRAM POSITION USER INTERFACE FOR PERSONAL VIDEO RECORDING TIME SHIFT BUFFER

TECHNICAL FIELD

The present invention is generally related to television systems, and, more particularly, is related to personal video recording.

BACKGROUND OF THE INVENTION

With recent advances in digital transmission technology, subscriber television systems are now capable of providing much more than the traditional analog broadcast video. In implementing enhanced programming, the home communication terminal device ("HCT"), otherwise known as the set-top box, has become an important computing device for accessing media content services (and media content within those services) and navigating a user through a maze of available services. In addition to supporting traditional analog broadcast video functionality, digital HCTs (or "DHCTs") now also support an increasing number of two-way digital services such as video-on-demand and personal video recording.

Typically, a DHCT is connected to a cable or satellite, or generally, a subscriber television system, and includes hardware and software necessary to provide the functionality of the digital television system at the user's site. Preferably, some of the software executed by a DHCT is downloaded and/or updated via the subscriber television system. Each DHCT also typically includes a processor, communication components, and memory, and is connected to a television or other display device, such as a personal computer. While many conventional DHCTs are stand-alone devices that are externally connected to a television, a DHCT and/or its functionality may be integrated into a television or personal computer or even an audio device such as a programmable radio, as will be appreciated by those of ordinary skill in the art.

DHCTs are typically capable of providing users with a very large number and variety of media content choices. As the number of available media content choices increases, viewing conflicts arise whereby the user must choose between watching two or more media content instances (e.g. discrete, individual instances of media content such as, for a non-limiting example, a particular television show or "program"), all of which the user would like to view. Further, because of the large number of viewing choices, the user may miss viewing opportunities. Buffering of media content instances in memory, or more recently, in storage devices (e.g. hard disk drives) coupled to the DHCT, has provided some relief from the conflict in viewing choices while providing personal video recording functionality. However, current buffering mechanisms for personal video recording are confusing to the user. Therefore, there exists a need to make personal video recording easier for users to understand.

Thus, a heretofore unaddressed need exists in the industry to address the aforementioned deficiencies and inadequacies.

BRIEF DESCRIPTION OF THE DRAWINGS

The preferred embodiments of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 1B shows a block diagram of the transmission signals supported by the STS of FIG. 1A, and input into the digital home communication terminal (DHCT) from the headend, in accordance with one embodiment of the invention.

DETAILED DESCRIPTION OF THE PREFERRED EMBODIMENTS

The preferred embodiments of the invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" given herein are intended to be non-limiting, and among others.

Figure 1A:
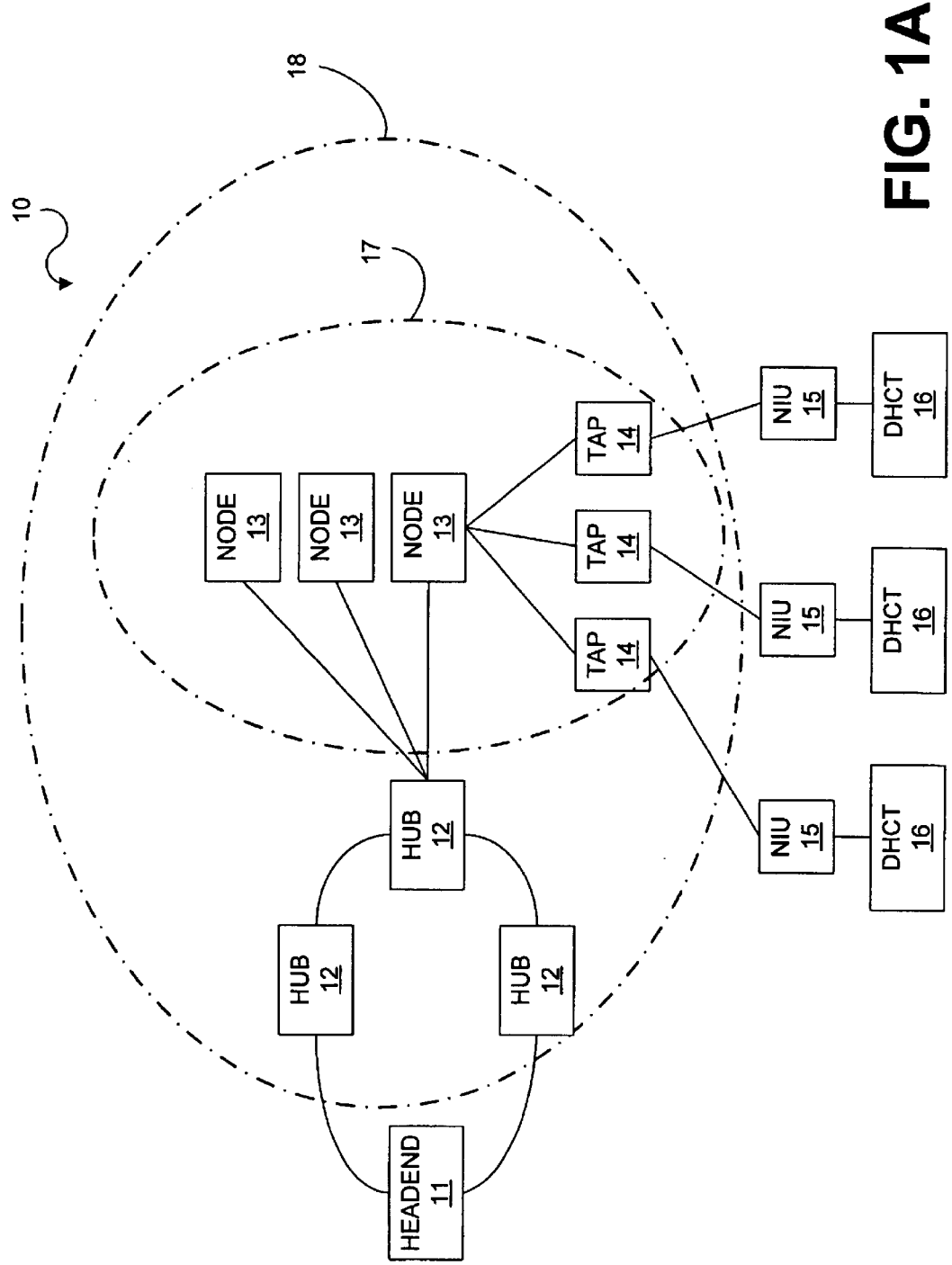
FIG. 1A is a block diagram of an example subscriber television system (STS), in accordance with one embodiment of the invention.

One embodiment of the invention is generally implemented as part of a subscriber television system (STS), which includes digital broadband delivery systems (DBDS) and cable television systems (CTS). As a non-limiting example, a subscriber television system (STS) and its operation will be described initially, with the understanding that other conventional data delivery systems are within the scope of the preferred embodiments of the invention. FIG. 1A shows a block diagram view of an STS 10, which is generally a high quality, reliable and integrated network system that is typically capable of delivering video, audio, voice and data services to digital home communication terminals (DHCTs) 16. Although FIG. 1A depicts a high level view of an STS 10, it should be appreciated that a plurality of subscriber television systems can tie together a plurality of regional networks into an integrated global network so that DHCT users can receive media content provided from anywhere in the world. Further, it will be appreciated that the STS 10 shown in FIG. 1A is merely illustrative and should not be construed as implying any limitations upon the scope of the preferred embodiments of the invention. For instance, subscriber television systems also included within the scope of the preferred embodiments of the invention include systems not utilizing physical structured cabling for transmission, such as, but not limited to, satellite systems. Further, transmission media included within the scope of the preferred embodiments of the invention include, but are not limited to, Hybrid Fiber/Coax (HFC), optical, satellite, radio frequency (RF), frequency modulated (FM), and microwave. Further, data provided from the headend 11 to the DHCTs 16 and programming necessary to perform the functions discussed below will be understood to be present in the STS 10, in accordance with the description below.

The STS 10 typically delivers broadcast video signals as digitally formatted signals in addition to delivering traditional broadcast analog video signals. Furthermore, the system can typically support one way broadcast services as well as both one-way data services and two-way media content and data services. The two-way operation of the network typically allows for user interactivity with services, such as Pay-Per-View programming, Near Video-On-Demand (NVOD) programming according to any of several known NVOD implementation methods, Video-on-Demand (VOD) programming (according to any of several VOD implementation methods), and interactive applications, such as Internet connections.

The STS 10 also provides the interfaces, network control, transport control, session control, and servers to access media content from media content services, and distributes media content to DHCT users. As shown in FIG. 1A, a typical STS 10 comprises a headend 11, hubs 12, an HFC access network 17, and DHCTs 16. It should be appreciated that although a single component (e.g. a headend) is illustrated in FIG. 1A, an STS 10 can feature a plurality of any one of the illustrated components or may be configured with alternative embodiments for any one of the individual components or with yet other additional components not enumerated above.

Media content provided by one or more content providers (not shown) is communicated by the content providers to one or more headends 11. From those headends 11 the media content is then communicated over a communications network 18 that includes a plurality of HFC access networks 17 (only one HFC access network 17 is illustrated). The HFC access network 17 typically comprises a plurality of HFC nodes 13, each of which may serve a local geographical area. The hub 12 connects to the HFC node 13 through a fiber portion of the HFC access network 17. The HFC node 13 is connected to a tap 14 which, in one embodiment, is connected to a network interface unit (NIU) 15 which is connected to a digital home communication terminal (DHCT) 16. In other embodiments, the tap 14 is connected directly to a digital home communication terminal (DHCT) 16. The NIU 15, when implemented, is normally located at the property of a subscriber and provides a transparent interface between the HFC node 13 and the user property internal wiring. Coaxial cables are typically used to couple nodes 13, taps 14 and NIUs 15 because the electrical signals can be easily repeated with RF amplifiers. As the high-level operations of many of the functions of a STS 10 are well known to those of ordinary skill in the art, further high level description of the overall STS 10 of FIG. 1A will not be contained herein FIG. 1B is a block diagram illustrating the transmission signals supported by the STS 10 (FIG. 1A), where the transmission signals 60, 64, 68, 72 and 76 are input into a DHCT 16 in accordance with one embodiment of the invention. One or more content providers (not shown) are one source of the information that is included in the transmission signals. Transmission signals can be generated at a headend 11 or at a hub 12 (FIG. 1A) that might function as a mini-headend and which therefore possesses some of the headend functionality.

As depicted in FIG. 1B, the STS 10 (FIG. 1A) can simultaneously support a number of transmission signal types, transmission rates, and modulation formats. The ability to carry analog and digital signals over a large bandwidth are characteristics of an HFC network typically employed in an STS, as in the STS 10 of FIG. 1A. As will be appreciated by those of ordinary skill in the art, analog and digital signals in HFC networks can be multiplexed using Frequency Division Multiplexing (FDM), which enables many different types of signals to be transmitted over the STS 10 to the DHCT 16. Typically, an STS 10 using HFC supports downstream (i.e., in the direction from the headend 11 to the DHCT 16) frequencies from 50 mega-hertz (MHz) to 870 MHz, whereas upstream frequencies (i.e., in the direction from the DHCT 16 to higher levels of the system) are in the 5 MHz to 42 MHz band. Generally, the RF bandwidth spacing for analog and digital services is 6 MHz. Furthermore, for a typical 870 MHz system in the United states (U.S.), a possible downstream RF spectrum subdivision plan uses 6 MHz frequency subdivisions, or spans, within the 50 MHz to 550 MHz band for analog video transmission signals and within the 550 MHz to 870 MHz range for digital transmission signals. The ATSs 60 shown in FIG. 1B are typically broadcast in 6 MHz frequency subdivisions, typically referred to in analog broadcasting as channels, having an analog broadcast signal composed of analog video and analog audio, and include Broadcast TV Systems Committee (BTSC) stereo and Secondary Audio Program (SAP) audio. Referring again to FIG. 1B, the downstream direction transmission signals, having been multiplexed, and in one embodiment using FDM, are often referred to as in-band transmission signals and include Analog Transmission Signals (ATSs) 60 and Digital Transmission Signals (DTSs) 64, 68, 72 (also known as Digital Transport Signals). These transmission signals carry video, audio, and data services. For example, these transmission signals may carry television signals, Internet data, or any additional types of data, such as Electronic Program Guide (EPG) data. Additionally, as will be appreciated by those of ordinary skill in the art, additional data can be sent with the analog video image in the Vertical Blanking Interval (VBI) of the video signal and stored in DHCT memory or a DHCT local physical storage device (not shown). It should be appreciated, however, that the amount of data that can be transmitted in the VBI of the analog video signal is typically significantly less than data transmitted in a DTS.

Like the ATSs 60, the DTSs 64, 68, 72 each occupies 6 MHz of the RF spectrum. However, the DTSs 64, 68, 72 are digital transmission signals consisting of 64- or 256-Quadrature Amplitude Modulated (QAM) digital signals formatted using Moving Picture Experts Group (MPEG) standards such as MPEG-2 transport streams, allocated in a separate frequency range. As will be described in more detail below, the MPEG-2 transport stream enables transmission of a plurality of DTS types over each 6 MHz RF subdivision, as compared to a 6 MHz ATS. The three types of digital transport signals illustrated in FIG. 1B include broadcast digital transmission signals 64, carousel digital transmission signals 68, and on-demand transmission signals 72.

MPEG-2 transport may be used to multiplex video, audio, and data in each of these Digital Transmission Signals (DTSs). However, because an MPEG-2 transport stream allows for multiplexed video, audio, and data into the same stream, the DTSs do not necessarily have to be allocated in separate 6 MHz RF frequencies, unlike ATSs 60. On the other hand, each DTS is capable of carrying multiple broadcast digital media content instances, multiple cycling data carousels containing broadcast data, and data requested on-demand by the subscriber. Data is formatted, such as in Internet Protocol (IP), mapped into MPEG-2 packets, and inserted into the multiplexed MPEG-2 transport stream. Encryption can be applied to the data stream for security so that the data may be received only by authorized DHCTs. The authorized DHCT 16 is provided with the mechanisms to receive, among other things, additional data or enhanced services. Such mechanisms can include "keys" that are required to decrypt encrypted data.

Each 6 MHz RF subdivision assigned to a digital transmission signal can carry the video and audio streams of the media content instances of multiple television (TV) stations, as well as media content and data that is not necessarily related to those TV media content instances, as compared to one TV channel broadcast over one ATS 60 that consumes the entire 6 MHz. The digital data is inserted into MPEG transport streams carried through each 6 MHz frequency subdivision assigned for digital transmission, and then demultiplexed at the subscriber DHCT so that multiple sets of data can be produced within each tuned 6 MHz frequency span, or subdivision.

Although broadcast in nature, the carousel DTSs 68 and on-demand DTSs 72 offer different functionality. Continuing with FIG. 1B, the broadcast DTSs 64 and carousel DTSs 68 typically function as continuous feed for indefinite time, whereas the on-demand DTSs 72 are continuous feeds sessions for a limited time. All DTS types are preferably capable of being transmitted at high data rates. The broadcast DTSs 64 carry typical data comprising multiple digitally-MPEG-2 compressed and formatted TV source signals and other continuously fed data information. The carousel DTSs 68 carry broadcast media content or data that is systematically broadcast in a cycling fashion but updated and revised as needed. Thus, the carousel DTSs 68 serve to carry high volume data such as media content and data and possibly, other data at high data rates. The carousel DTSs 68 preferably carry data formatted in directories and files by a Broadcast File System (BFS) (not shown), which is used for producing and transmitting data streams throughout the STS 10, and which provides an efficient means for the delivery of application executables and application media content and data to the DHCT, as will be described below. Media content and data received by the DHCT 16 in such manner can then be saved in the DHCT memory and/or transferred to the DHCT storage device for later use. The on-demand DTSs 72, on the other hand, can carry particular information such as compressed video and audio pertaining to subscriber requested media content instance preview and/or media content instance descriptions, as well as other specialized data information.

The User-to-Network Download Protocol of the MPEG-2 standard's DSM-CC specification (Digital Storage Media—Command and Control) provides the data carousel protocol used for broadcasting data from a server located at headend 11, or elsewhere. It also provides the interactive download protocol for reliable downloading of data from a server (possibly the same server) to an individual DHCT through the on-demand DTSs. Each carousel and on-demand DTS is defined by a DSM-CC session. Therefore, some of the basic functionality reflected in the DHCT 16 when the DHCT does not have a local physical storage device is somewhat similar to a networked computer (i.e., a computer without a persistent storage device), in addition to traditional set top box functionality, as is well known to those of ordinary skill in the art. A DHCT 16 with a storage device reduces data access latency when the data is stored in the local physical storage device ahead of time.

Also shown in FIG. 1B are Out-Of-Band (OOB) signals that provide continuously available two-way signaling to the subscribers' DHCT 16 regardless of which in-band signals are tuned to by the individual DHCT in-band tuners, as described below. The OOB signals consist of a Forward Data Signal (FDS) 76 and a Reverse Data Signal (RDS) 80. The OOB signals can comply to any one of a number of well known transport protocols but preferably comply to either a DAVIC 1.1 Transport Protocol with FDS of 1.544 mega-bits per second (Mbps) or more using quadrature phase shift keying (QPSK) modulation and an RDS of 1.544 Mbps or more using QPSK modulation, or to a DOCSIS Transport Protocol with FDS of 27 Mbps using 64-QAM modulation and a RDS of 1.544 Mbps or more using QPSK modulation or 16-QAM modulation. The OOB signals provide the two-way operation of the network, which allows for subscriber interactivity with the applications and services provided by the network. Furthermore, the OOB signals are not limited to a 6 MHz spectrum, but generally to a smaller spectrum, such as 1.5 or 3 MHz.

Figure 2:
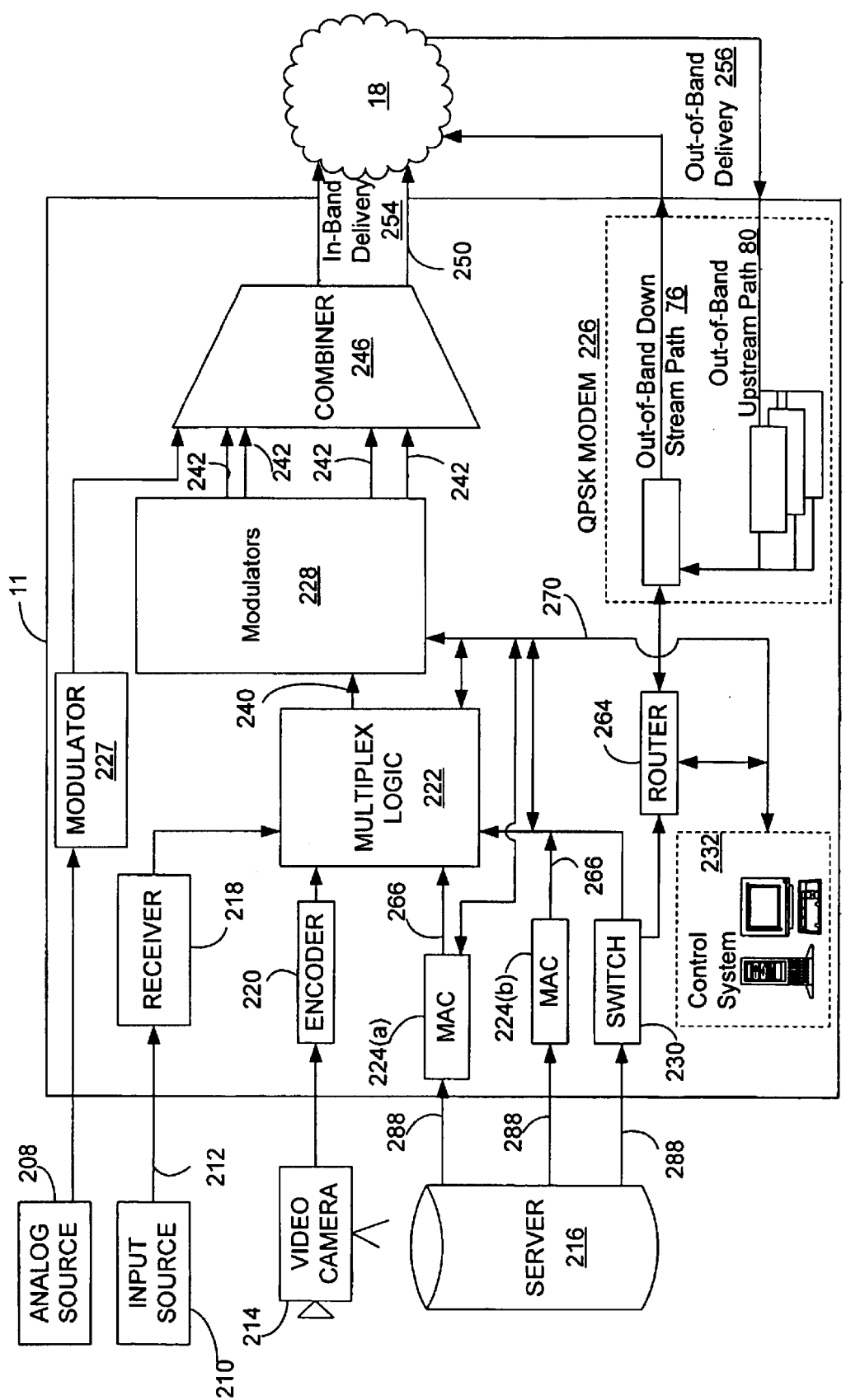
FIG. 2 is a block diagram of an example headend as depicted in FIG. 1A and related equipment, in accordance with one embodiment of the invention.

FIG. 2 is an overview of a headend 11, which provides the interface between the STS 10 (FIG. 1A) and the service and content providers. The overview of FIG. 2 is equally applicable to a hub 12, and the same elements and principles may be implemented at a hub 12 instead of the headend 11 as described herein. It will be understood that the headend 11 shown in FIG. 2 is merely illustrative and should not be construed as implying any limitations upon the scope of the preferred embodiments of the invention. The headend 11 receives content from a variety of service and content providers, which can provide input in a variety of ways. The headend 11 combines the content from the various sources and distributes the content to subscribers via the distribution systems of the network 18.

In a typical system, the programming, services and other information from content providers can be distributed according to a variety of mechanisms. The input signals may be transmitted from sources to the headend 11 via a variety of transmission paths, including satellites (not shown), and terrestrial broadcast transmitters and antennas (not shown). The headend 11 can also receive content from a direct feed source 210 via a direct line 212. Other input sources from content providers include a video camera 214, analog input source 208, or an application server 216. The application server 216 may include more than one line of communication. One or more components such as analog input source 208, input source 210, video camera 214, and application server 216 can be located external to the headend 11, as shown, or internal to the headend 11 as would be appreciated by one having ordinary skill in the art. The signals provided by the content or programming input sources can include a single media content instance (i.e. individual instances of media content such as an episode of a television show, a movie, or web-page, etc.) or a multiplex that includes several media content instances.

The headend 11 generally includes one or more receivers 218 that are each associated with a content source. MPEG encoders, such as encoder 220, are included for digitally encoding at least some local programming or a real-time feed from video camera 214, or the like. The encoder 220 outputs the respective compressed video and audio streams corresponding to the analog audio/video signal received at its input. For example, encoder 220 can output formatted MPEG-2 or MPEG-1 packetized elementary (PES) streams or transport streams compliant to the syntax and semantics of the ISO MPEG-2 standard, respectively. The PES or transport streams may be multiplexed with input signals from switch 230, receiver 218 and control system 232. The multiplexing logic 222 processes the input signals and multiplexes at least a portion of the input signals into transport stream 240. Analog input source 208 can provide an analog audio/video broadcast signal which can be input into modulator 227. From modulator 227, a modulated analog output signal can be combined at combiner 246 along with other modulated signals for transmission into transmission medium 250. Alternatively, analog audio/video broadcast signal from analog input source 208 can be input into modulator 228. Alternatively, analog audio/video broadcast signal can be input directly from modulator 227 to transmission medium 250. The analog broadcast media content instances are transmitted via respective RF channels, each assigned for transmission of an analog audio/video signal such as National Television Standards Committee (NTSC) video, as described in association with FIG. 1B.

The switch, such as asynchronous transfer mode (ATM) switch 230, provides an interface to an application server 216. There can be multiple application servers 216 providing a variety of services such as a Pay-Per-View service, including video on demand (VOD), a data service, an Internet service, a network system, or a telephone system. Service and content providers may download content to an application server located within the STS 10. The application server 216 may be located within the headend 11 or elsewhere within the STS 10, such as in a hub 12. The various inputs into the headend 11 are then combined with the other information from the control system 232, which is specific to the STS 10, such as local programming and control information, which can include, among other things, conditional access information. The headend 11 contains one or more modulators 228 to convert the received transport streams 240 into modulated output signals suitable for transmission over the transmission medium 250 through the network 18. Each modulator 228 may be a multimodulator including a plurality of modulators, such as, but not limited to, QAM modulators, that radio frequency modulate at least a portion of the transport streams 240 to become output transport streams 242. The output signals 242 from the various modulators 228 or multimodulators are combined, using equipment such as a combiner 246, for input into the transmission medium 250, which is sent via the in-band delivery path 254 to subscriber locations (not shown). In-band delivery path 254 can include DTS 64, 68, 72, and ATS 60, as described with FIG. 1B. In one embodiment, the server 216 also provides various types of data 288 to the headend 11. The data, in part, is received by the media access control functions 224 that output MPEG transport packets containing data 266 instead of digital audio/video MPEG streams. The control system 232 enables the television system operator to control and monitor the functions and performance of the STS 10. The control system 232 interfaces with various components, via communication link 270, in order to monitor and/or control a variety of functions, including the frequency spectrum lineup of the programming for the STS 10, billing for each subscriber, and conditional access for the content distributed to subscribers. Information, such as conditional access information, is communicated from the control system 232 to the multiplexing logic 222 where it is multiplexed into a transport stream 240.

Among other things, the control system 232 provides input to the modulator 228 for setting the operating parameters, such as selecting certain media content instances or portions of transport streams for inclusion in one or more output transport stream 242, system specific MPEG table packet organization, and/or conditional access information. Control information and other data can be communicated to hubs 12 (FIG. 1A) and DHCTs 16 (FIG. 1A) via an in-band delivery path 254 or via an out-of-band delivery path 256.

The out-of-band data is transmitted via the out-of-band FDS 76 (FIG. 1B) of transmission medium 250 by means such as, but not limited to, a Quadrature Phase-Shift Keying (QPSK) modem array 226. Two-way communication utilizes the RDS 80 (FIG. 1B) of the out-of-band delivery path 256. Hubs 12 (FIG. 1A) and DHCTs 16 (FIG. 1A) transmit out-of-band data through the transmission medium 250, and the out-of-band data is received in headend 11 via out-of-band RDS 80. The out-of-band data is routed through router 264 to an application server 216 or to control system 232. The out-of-band control information includes such information as a pay-per-view purchase instruction and a pause viewing command from the subscriber location to a video-on-demand type application server located internally or external to the headend 11, such as application server 216, as well as any other data sent from the DHCT 16 or hubs 12, all of which will preferably be properly timed. The control system 232 also monitors, controls, and coordinates all communications in the subscriber television system, including video, audio, and data. The control system 232 can be located at the headend 11 or remotely.

The transmission medium 250 distributes signals from the headend 11 to the other elements in the subscriber television system, such as a hub 12, a node 13, and subscriber locations (FIG. 1A). The transmission medium 250 can incorporate one or more of a variety of media, such as optical fiber, coaxial cable, and HFC, satellite, direct broadcast, or other transmission media.

Figure 3A:
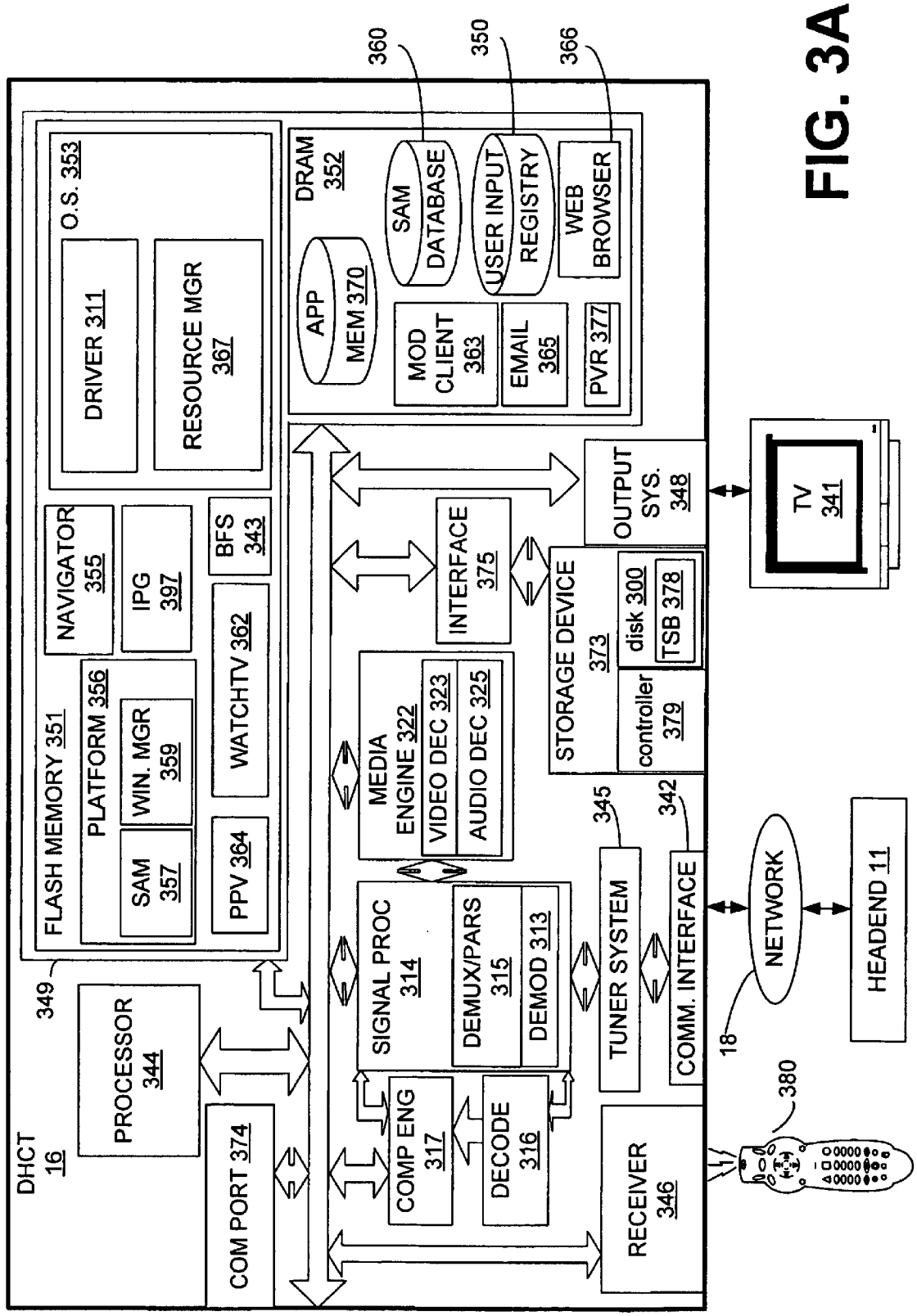
FIG. 3A is a block diagram of an example DHCT as depicted in FIG. 1A and related equipment, in accordance with one embodiment of the invention.

FIG. 3A is a block diagram illustration of an example DHCT 16 that is coupled to a headend 11 and to a television, in accordance with one embodiment of the invention. It will be understood that the DHCT 16 shown in FIG. 3A is merely illustrative and should not be construed as implying any limitations upon the scope of the preferred embodiments of the invention. For example, some of the functionality performed by applications executed in the DHCT 16 (such as the MOD client application 363) may instead be performed at the headend 11 and vice versa, or not at all in some embodiments. A DHCT 16 is typically situated at the residence or place of business of a user and may be a stand-alone unit or integrated into another device such as, for example, a television set or a personal computer or other display devices or an audio device. The DHCT 16 preferably includes a communications interface 342 for receiving signals (video, audio and/or other data) from the headend 11 through the network 18 and for providing any reverse information to the headend 11 through the network 18.

The DHCT 16 further preferably includes one or more processors, such as processor 344, for controlling operations of the DHCT 16, an output system 348 for driving the television display 341, and at least one tuner system 345 for tuning into a particular television channel or frequency to display media content and for sending and receiving various types of data or media content to and from the headend 11. The DHCT 16 may include, in other embodiments, multiple tuners for receiving downloaded (or transmitted) media content. Tuner system 345 can select from a plurality of transmission signals (FIG. 1B) provided by the subscriber television system. Tuner system 345 enables the DHCT 16 to tune to downstream media and data transmissions, thereby allowing a user to receive digital or analog media content delivered in the downstream transmission via the subscriber television system. The tuner system 345 includes, in one implementation, an out-of-band tuner for bi-directional QPSK data communication and a QAM tuner (in band) for receiving television signals. Additionally, a receiver 346 receives externally generated information, such as user inputs or commands from an input device, such as remote control device 380, or other devices.

According to another embodiment of the invention, a telephone modem (not shown) in the DHCT 16 can be utilized for upstream data transmission and a headend 11, hub 12 (FIG. 1A) or other component located upstream in the STS 10 (FIG. 1A) can receive data from a telephone network corresponding with the telephone modem and can route the upstream data to a destination internal or external to the STS 10, such as an application data server in the headend 11 or content provider.

The DHCT 16 includes signal processing system 314, which comprises demodulating system 313 and transport demultiplexing and parsing system 315 (herein demultiplexing system) to process broadcast media content and/or data.

One or more of the systems of signal processing system 314 can be implemented with software, a combination of software and hardware, or preferably in hardware. Demodulating system 313 comprises functionality for RF signal demodulation, either an analog transmission signal or a digital transmission signal. For instance, demodulating system 313 can demodulate a digital transmission signal in a carrier frequency that was modulated, among others, as a QAM-modulated signal. When tuned to a carrier frequency corresponding to an analog TV signal transmission, demultiplexing system 315 is bypassed and the demodulated analog TV signal that is output by demodulating system 313 is instead routed to analog video decoder 316. Analog video decoder 316 converts the analog video signal (i.e. the video portion of a media content instance that comprises a video portion and an audio portion) received at its input into a respective non-compressed digital representation comprising a sequence of digitized pictures and their respective digitized audio. Presented at the input to analog video decoder 316 is an analog video signal such as NTSC video comprising of audio and video. In one implementation, the video consists of a sequence of fields spaced apart at approximately one-sixtieth of a second. A pair of consecutive fields constitutes a picture. The odd field contains the odd-numbered lines of the picture and the even field contains the even-numbered lines of the picture. Analog video decoder 316 outputs the corresponding sequence of digitized pictures and respective digitized audio. Each picture is a two dimensional entity of picture elements and each picture element contains a respective set of values. A picture element value comprises luminance and chrominance information that are representative of brightness and color information at the spatial location of the picture element within the picture.

Digitized pictures and respective audio output by analog video decoder 316 are presented at the input of compression engine 317. Digitized pictures and respective audio output by analog video decoder 316 can also be presented to an input of media engine 322 via an interface (not shown) dedicated for non-compressed digitized analog video and audio, such as ITU-656 (International Telecommunications Union or ITU), for display on TV 341. Compression engine 317 is coupled to localized memory 349, preferably DRAM that is dedicated to the compression engine, for input and processing of the input digitized pictures and their respective digitized audio. Alternatively, compression engine 317 can have its own integrated memory (not shown). Compression engine 317 processes the sequence of digitized pictures and digitized audio and converts them into a video compressed stream and an audio compressed stream, respectively. The compressed audio and video streams are produced in accordance with the syntax and semantics of a designated audio and video coding method, such as specified by the MPEG-2 audio and MPEG-2 video ISO (International Organization for Standardization or ISO) standard, so that they can be interpreted by video decoder 323 and audio decoder 325 for decompression and reconstruction at a future time. Each compressed stream consists of a sequence of data packets containing a header and a payload. Each header contains a unique program identification, or PID, associated with the respective compressed stream.

Compression engine 317 multiplexes the audio and video compressed streams into a transport stream, such as an MPEG-2 transport stream, for output. Furthermore, compression engine 317 can preferably compress audio and video corresponding to more than one media content instance in parallel (e.g., from two tuned analog TV signals)

and to multiplex the respective audio and video compressed streams into a single transport stream. Output of compressed streams and/or transport streams produced by compression engine 317 is input to signal processing system 314. Parsing capabilities 315 within signal processing system 314 allow for interpretation of sequence and picture headers, for instance, annotating their locations within their respective compressed stream for future retrieval from storage device 373. A compressed analog media content instance (e.g. TV program episode or show) corresponding to a tuned analog transmission channel can be output as a transport stream by signal processing 314 and presented as input for storage in storage device 373 via interface 375 as will be described below. The packetized compressed streams can be also output by signal processing 314 and presented as input to media engine 322 for decompression by video decompression engine 323 and audio decompression engine 325 for its display on TV 341, as will be described below.

Demultiplexing system 315 can include MPEG-2 transport demultiplexing. When tuned to carrier frequencies carrying a digital transmission signal, demultiplexing system 315 enables the separation of packets of data, corresponding to the compressed streams of information belonging to the desired media content instances, for further processing. Concurrently, demultiplexing system 315 precludes packets in the multiplexed transport stream that are irrelevant or not desired, such as packets of data corresponding to compressed streams of media content instances of other media content signal sources (e.g. other TV channels), from further processing.

Parsing capabilities of demultiplexing system 315 include reading and interpreting the received transport stream without disturbing its content, such as to interpret sequence and picture headers, for instance, to annotate their locations within their respective compressed stream for future retrieval from storage device 373. Thus, the components of signal processing system 314 are capable of QAM demodulation, forward error correction, and demultiplexing MPEG-2 transport streams, and parsing elementary streams and packetized elementary streams. A compressed media content instance corresponding to a tuned carrier frequency carrying a digital transmission signal can be output as a transport stream by signal processing 314 and presented as input for storage in storage device 373 via interface 375 as will be described below. The packetized compressed streams can be also output by signal processing system 314 and presented as input to media engine 322 for decompression by video decompression engine 323 and audio decompression engine 325 as will be described below.

One having ordinary skill in the art will appreciate that signal processing system 314 will preferably include other components not shown, including memory, decryptors, samplers, digitizers (e.g. analog-to-digital converters), and multiplexers, among others. Further, other embodiments will be understood, by those having ordinary skill in the art, to be within the scope of the preferred embodiments of the present invention, including analog signals (e.g. NTSC) that bypass one or more elements of the signal processing system 314 and are forwarded directly to the output system 348. Further, outputs presented at corresponding next-stage inputs for the aforementioned signal processing flow may be connected via accessible memory 349 in which the outputting device stores the output data and the inputting device thereafter inputs the output data written to memory 349 by the respective outputting device. Outputting and inputting devices include analog video decoder 316, compression engine 317, media engine 322, signal processing system 314, and components or subcomponents thereof. Further, it will be understood by those having ordinary skill in the art that components of signal processing system 314 can be spatially located in different areas of the DHCT 16. Further, it will be understood by those having ordinary skill in the art that, although the components of signal processing system 314 are illustrated as being in communication with an incoming signal from the communications interface 342, the signal may not necessarily be in the order shown for all signals.

The DHCT 16 also includes media engine 322, which includes digital video decoder 323 also known as video decompression engine, and digital audio decoder 325 also known as audio decompression engine, and other digital signal processing components not shown, as would be appreciated by those having ordinary skill in the art. For example, demultiplexing system 315 is in communication with tuner system 345 and processor 344 to effect reception of digital compressed video streams, digital compressed audio streams, and data streams corresponding to one or more media content instances to be separated from other media content instances and/or streams transported in the tuned transmission channel and to be stored in a first part (not shown) of DRAM 352 of DHCT 16 assigned to receive packets of one or more media content instances. Other dedicated memory may also be used for media content instance packets.

Furthermore, while conducting this process, demultiplexing system 315 demultiplexes and separates desired compressed streams from the received transport stream without disturbing its content. Further, parser 315 parses (i.e., reads and interprets) compressed streams such as to interpret sequence headers and picture headers, and deposits a transport stream carrying compressed streams of a first media content instance into DRAM 352. Processor 344 causes transport stream in DRAM 352 to be transferred to the storage device 373 via interface 375. Under program control by processor 344, the demultiplexing system 315 in communication with the digital video decoder 323, storage device 373, and processor 344 effect notification and/or transfer of received packets of one or more compressed streams corresponding to one or more media content instances from a first part of DRAM 352 to a second part (not shown) of DRAM 352 assigned to the digital video decoder 323 and the digital audio decoder 325. Alternatively, media engine 322 can have access to a dedicated localized DRAM (not shown). Upon demultiplexing and parsing the transport stream carrying one or more media content instances, signal processing system 314 outputs to DRAM 352 ancillary data in the form of a table or data structure (not shown) comprising the relative or absolute location of the beginning of certain pictures in the compressed media content instance for convenience in retrieval during future operations.

In another embodiment, according to a plurality of tuners, and respective number of demodulating systems 313, demultiplexing systems 315, and signal processing systems 314, a respective number of broadcast digital media content instances are received and routed to the hard disk 300 of storage device 373 simultaneously. Alternatively, a single demodulating system 313, a single demultiplexing system 315, and a single signal processing system 314, each with sufficient processing capabilities can serve to process more than one digital media content instance.

In another embodiment according to the aforementioned description, a first tuner of tuning system 345 receives an analog video signal corresponding to a first media content instance and a second tuner simultaneously receives a digital compressed stream corresponding to a second media content instance. First media content instance is processed as an analog signal and second media content instance is processed as a digital compressed stream as described above.

In one implementation, compression engine 317 can output formatted MPEG-2 or MPEG-1 packetized elementary streams (PES) inside a transport stream, all compliant to the syntax and semantics of the ISO MPEG-2 standard. Alternatively, compression engine 317 can output other digital formats that are compliant to other standards. The digital compressed streams output by compression engine 317 corresponding to a first media content instance are deposited in local memory for compression engine 317 and routed to demultiplexing system 315. Demultiplexing system 315 parses (i.e., reads and interprets) the transport stream generated by compression engine 317 without disturbing its content, such as to interpret picture headers, and deposits the transport stream into DRAM 352. Processor 344 causes transport stream in DRAM 352 to be transferred to the storage device 373. While parsing the transport stream, demultiplexing system 315 outputs to memory 352 ancillary data in the form of a table or data structure (not shown) comprising the relative or absolute location of the beginning of certain pictures in the compressed media content stream for the first media content instance for convenience in retrieval during future operations. In this way, random access operations such as fast forward, rewind, and jumping to a location in the compressed media content instance can be attained.

In another embodiment, according to a plurality of tuners, a respective number of analog video decoders 316, and a respective number of compression engines 317, the aforementioned compression of analog video and audio is performed and routed to hard disk 300 of the storage device 373 simultaneously for a respective number of analog media content instances. Alternatively, a single compression engine with sufficient processing capabilities can serve to compress more than one analog media content instance.

One or more programmed software applications, herein referred to as applications, are executed by utilizing the computing resources in the DHCT 16. The applications, or application clients, may be resident in FLASH memory 351 or downloaded (or uploaded) into DRAM 352. Applications stored in FLASH memory 351 or DRAM 352 are executed by processor 344 (e.g., a central processing unit or digital signal processor) under the auspices of the operating system 353. Data required as input by an application is stored in DRAM 352 or FLASH memory 351 and read by processor 344 as need be during the course of application execution. Input data may be data stored in DRAM 352 by a secondary application or other source, either internal or external to the DHCT 16, or possibly anticipated by the application and thus created with the application at the time it was generated as a software application, in which case it is stored in FLASH memory 351. Data generated by an application is stored in DRAM 352 by processor 344 during the course of application execution. DRAM 352 also includes application memory 370 that various applications may use for storing and/or retrieving data.

An application referred to as navigator 355 is also resident in FLASH memory 351 for providing a navigation framework for services provided by the DHCT 16. The navigator 355 registers for and in some cases reserves certain user inputs related to navigational keys such as channel increment/decrement, last channel, favorite channel, etc. The navigator 355 also provides users with television related menu options that correspond to DHCT functions such as, for example, blocking a channel or a group of channels from being displayed in a channel menu presented on a screen display.

The FLASH memory 351 also contains a platform library 356. The platform library 356 is a collection of utilities useful to applications, such as a timer manager, a compression manager, a configuration manager, a hyper text markup language (HTML) parser, a database manager, a widget toolkit, a string manager, and other utilities (not shown). These utilities are accessed by applications via application programming interfaces (APIs) as necessary so that each application does not have to contain these utilities. Two components of the platform library 356 that are shown in FIG. 3A are a window manager 359 and a service application manager (SAM) client 357.

The window manager 359 provides a mechanism for implementing the sharing of the screen regions and user input. The window manager 359 on the DHCT 16 is responsible for, as directed by one or more applications, implementing the creation, display, and de-allocation of the limited DHCT 16 screen resources. It allows multiple applications to share the screen by assigning ownership of screen regions, or windows. The window manager 359 also maintains, among other things, a user input registry 350 in DRAM 352 so that when a user enters a key or a command via the remote control device 380 or another input device such as a keyboard or mouse, the user input registry 350 is accessed to determine which of various applications running on the DHCT 16 should receive data corresponding to the input key and in which order. As an application is executed, it registers a request to receive certain user input keys or commands. When the user presses a key corresponding to one of the commands on the remote control device 380, the command is received by the receiver 346 and relayed to the processor 344. The processor 344 dispatches the event to the operating system 353 where it is forwarded to the window manager 359 which ultimately accesses the user input registry 350 and routes data corresponding to the incoming command to the appropriate application.

The SAM client 357 is a client component of a client-server pair of components, with the server component (not shown) being located on the headend 11, preferably in the control system 232 (FIG. 2). A SAM database 360 (i.e. structured data such as a database or data structure) in DRAM 352 includes a data structure of services and a data structure of channels that are created and updated by the headend 11. Herein, database will refer to a database, structured data or other data structures as is well known to those of ordinary skill in the art. Many services can be defined using the same application component, with different parameters. Examples of services include, without limitation and in accordance with one implementation, presenting television instances (available through a WatchTV application 362), pay-per-view events (available through a PPV application 364), digital music (not shown), media-on-demand (available through an MOD application 363), and an interactive program guide (IPG) 397. In general, the identification of a service includes the identification of an executable application that provides the service along with a set of application-dependent parameters that indicate to the application the service to be provided. As an example, a service of presenting a television instance (media content instance) could be executed by the WatchTV application 362 with a set of parameters specifing the HBO to view HBO or with a separate set of parameters to view CNN. Each association of the application component (tune video) and one parameter component (HBO or CNN) represents a particular service that has a unique service I.D. The SAM client 357 also interfaces with the resource manager 367, as discussed below, to control resources of the DHCT 16.

Application clients can also be downloaded into DRAM 352 at the request of the SAM client 357, typically in response to a request by the user or in response to a message from the headend 11. In the example DHCT 16 illustrated in FIG. 3A, DRAM 352 includes a media-on-demand application (MOD) 363, an e-mail application 365, PVR application 377, and a web browser application 366. It should be clear to one with ordinary skill in the art that these applications are not limiting and merely serve as examples for embodiments of the invention. Furthermore, one or more DRAM based applications may be resident, as an alternative embodiment, in FLASH memory 351. These applications, and others provided by the subscriber television system operator, are top-level software entities on the network for providing services to the user.

In one implementation, applications executing on the DHCT 16 work with the navigator 355 by abiding by several guidelines. First, an application utilizes the SAM client 357 for the provision, activation, and suspension of services. Second, an application shares DHCT 16 resources with other applications and abides by the resource management policies of the SAM client 357, the operating system 353, and the DHCT 16. Third, an application handles situations where resources are only available with navigator 355 intervention. Fourth, when an application loses service authorization while providing a service, the application suspends the service via the SAM (the navigator 355 will reactivate an individual service application when it later becomes authorized). Finally, an application client, or application, is designed to not have access to certain user input keys reserved by the navigator (i.e., power, channel +/−, volume +/−, etc.).

The MOD client application 363 provides the user with lists of available media content titles for each media content instance to choose from and with media content instances requested by the user. The MOD client application 363 provides media content to the user by engaging, typically, in a direct two-way IP (Internet Protocol) connection with VOD content servers (not shown) that would be located, in one embodiment, in the headend 11.

An executable program or algorithm corresponding to an operating system (OS) component, or to a client platform component, or to an application client, or to respective parts thereof, can reside in and execute out of DRAM 352 and/or FLASH memory 351. Likewise, data input into or output from any executable program can reside in DRAM 352 or FLASH memory 351. Furthermore, an executable program or algorithm corresponding to an operating system component, or to a client platform component, or to an application client, or to respective parts thereof, can reside in FLASH memory 351, or in a local storage device (such as storage device 373) externally connected to or integrated into DHCT 16 and be transferred into DRAM 352 for execution. Likewise, data input for an executable program can reside in FLASH memory 351 or a storage device and be transferred into DRAM 352 for use by an executable program or algorithm. In addition, data output by an executable program can be written into DRAM 352 by an executable program or algorithm and be transferred into FLASH memory 351 or into a storage device. In other embodiments, the executable code is not transferred, but instead, functionality is effected by other mechanisms.

The DHCT 16 may also include one or more wireless or wired interfaces, also called communication ports 374, for receiving and/or transmitting data to other devices. For instance, the DHCT 16 may feature USB (Universal Serial Bus), Ethernet (for connection to a computer), IEEE-1394 (for connection to media content devices in an entertainment center), serial, and/or parallel ports. The user inputs may be, for example, provided by an input device including a computer or transmitter with buttons or keys located either on the exterior of the terminal or by a hand-held remote control device 380 or keyboard that includes user-actuated buttons, or even aural input (e.g. voice activated).

Figure 3B:
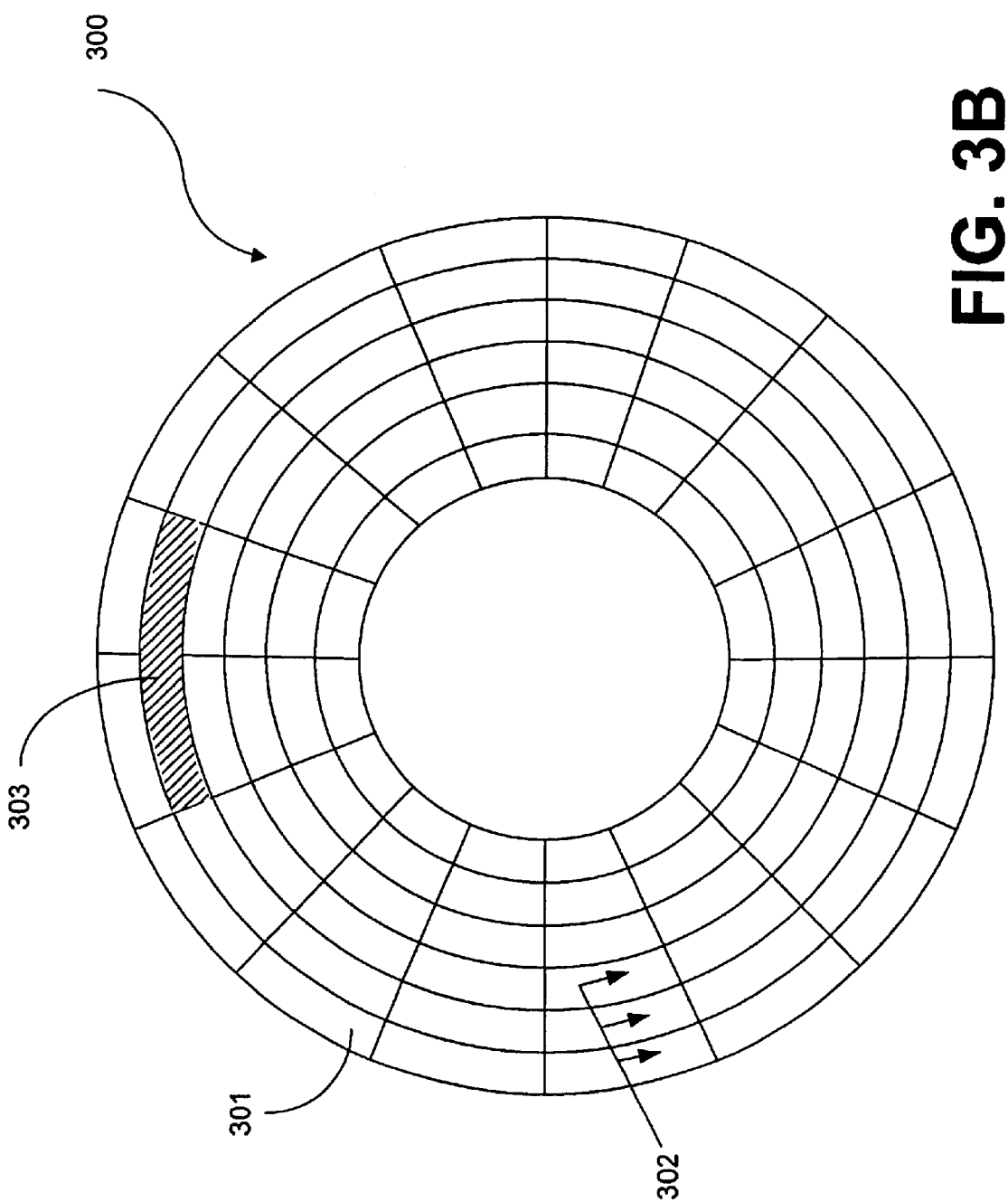
FIG. 3B is a block diagram of an example hard disk and hard disk elements located within the storage device coupled to the DHCT depicted in FIG. 3A.

The DHCT 16 includes at least one storage device 373 to provide storage for downloaded media content. Storage device 373 can be an optical storage device or a magnetic storage device, among others, and is preferably a hard disk drive. Storage device 373 comprises storage for media content and/or data that can be written to for storage and later read from for retrieval for presentation. The storage device 373 preferably includes at least one hard disk 300. Throughout this disclosure, references relating to writing to or reading from the storage device 373, or references regarding recordings from or to the storage device 373 will be understood to mean that such read or write operations are occurring to the actual medium (for example, the hard disk 300) of the storage device 373. The storage device 373 is also comprised of a controller 379 that receives operating instructions from the device driver 311 of the operating system 353 (as described below) and implements those instructions to cause read and/or write operations to the hard disk 300. The device driver 311 communicates with the storage device controller 379 to format the hard disk 300, causing the hard disk to be divided radially into sectors 301 and concentric circles called tracks 302, as illustrated by the block diagram illustration of the example hard disk 300 in FIG. 3B. Note from FIG. 3B that the same number of sectors 301 per track 302 are illustrated, but other embodiments with a different number of tracks per side, sectors per track, bytes per sector, and in different zones of tracks, are within the scope of the preferred embodiments of the invention. The sector 301 is the basic unit of storage on the hard disk 300. In one implementation, each sector 301 of a hard disk 300 can store 512 bytes of user data. While data is stored in 512-byte sectors on the hard disk 300, the cluster, such as example cluster 303, is typically the minimum unit of data storage the operating system 353 uses to store information. Two or more sectors on a single track make up a cluster.

Referring again to FIG. 3A, there are a variety of ways in which the storage device 373 may be coupled to the DHCT 16. The storage device 373 is, for example, preferably internal to the DHCT 16, internally coupled to the DHCT 16 through a common bus through a communication interface 375, preferably an integrated drive electronics (IDE) interface or small computer system interface (SCSI), although IEEE-1394 or USB, among others, can be used. In other embodiments, the storage device 373 can be externally coupled to (and thus removable from) the DHCT 16 via a communication port 374 implemented as IEEE-1394 or USB or as a data interface port such as a SCSI or an IDE interface. In one implementation, under the auspices of the real-time operating system 353 (as described below) and executed by processor 344, and in coordination with the personal video recording (PVR) application client 377, the device driver 311, and the device controller 379 (the latter three components described below), downloaded media content (herein understood to also refer to other types of data, in addition to, or instead of, media content instances) are received in the DHCT 16 via communications interface 342, processed as described above, and stored in a temporary cache (not shown) in memory 349. The temporary cache is implemented and managed to enable media content transfers from the temporary cache to storage device 373, or, in concert with the insertion of a newly arriving media content into the temporary cache. In one implementation, the fast access time and high data transfer rate characteristics of the storage device 373 enables media content to be read from the temporary cache in memory 349 and written to storage device 373 in a sufficiently fast manner. Orchestration of multiple simultaneous data transfer operations is effected so that while media content is being transferred from the cache in memory 349 to storage device 373, new media content is received and stored in the temporary cache of memory 349. In other implementations, the downloaded media content is received through communications port 374 in the DHCT 16 and then transferred directly to storage device 373, thus bypassing the temporary cache.

The operating system 353, device driver 311, and controller 379 cooperate to create a special file in one of the hard disk sectors called a file allocation table (FAT) (not shown). The FAT is where the operating system 353 stores the information about the hard disk's directory, or media content instance file folder structure, and which clusters are used to store which media content instance files. The operating system 353 can determine where a file's data is located by using the directory entry (not shown) for the file and the entries of the FAT 304. The directory entry gives information about a directory such as its related files and subdirectories and create time, and special permissions. A FAT entry describes the physical locations of data for media content downloaded to the hard disk 300 of the storage device 373. The FAT also keeps track of which clusters are free, or open, and thus available for use. Updates to the FAT are provided for by the operating system 353, or the device driver 311, or a combination of both. Writes to the hard disk are coordinated between the PVR application 377 (described below), the operating system 353, the device driver 311, and the storage device controller 379.

Processor 344 in communication generally with device driver 311 and storage device controller 379 and demultiplexing system 315 effect retrieval of compressed video streams, compressed audio streams, and data streams corresponding to one or more media content instances from storage device 373. Retrieved streams are deposited in an output cache in storage device 373 and transferred to DRAM 352, and then processed for playback according to mechanisms well known to those having ordinary skill in the art. In some embodiments, the media content instances are retrieved and routed from the hard disk 300 to the video and audio decoding system 323 and 325 simultaneously, and then further processed for eventual presentation on a display device or other device.

The PVR application 377 provides for media content recording functionality by enabling the temporary writing to, and if requested, more permanent recording (i.e. relatively permanent) to the storage device 373. Media content can be transmitted (or downloaded) from a remote location, such as, for example, a remote server located in the head end 11, or from a home communication network, or from other consumer electronic devices. Downloaded media content that is received at each tuner 345 is temporarily buffered, or stored, on the hard disk of the storage device. The corresponding space on the hard disk is called buffer space, or a time shift buffer (TSB) 378. Each tuner in tuner system 345 has a respective TSB 378. Note that buffering is understood to mean temporarily receiving media content, resulting either from reception of a broadcast digital channel or a digital compressed version of a broadcast analog channel, and/or data into the buffer space, or TSB 378, of the storage device 373.

Media content received into the TSB 378 will have a temporary recording designation. That is, media content stored in clusters of the TSB 378 will have a temporary residence. This receiving of media content into the TSB 378 for temporary residence will also be referred to as buffering. The media content stored in the TSB 378 will either be deleted (i.e. the clusters storing the media content will be configured as writeable for eventual write operations that overwrite the media content within those clusters) or retained (through election by the user) as a permanent recording. A permanent recording will be understood to mean media content that is stored for an extended period of time as decided by the user. Permanent recordings are stored in non-buffer clusters (i.e. not in clusters of the TSB 378) that are not used for the TSB 378 in instances when the user elects in advance to make a scheduled recording of a media content instance that has not yet been tuned to at the DHCT 16. A permanent recording can also be achieved by selecting a media content instance stored in the TSB 378 and designating the media content instance as permanent. In this latter implementation, the designated media content is stored in clusters that are configured from TSB clusters to permanent recording clusters (non-buffer clusters). Thus, permanent recordings will preferably be more permanent than media content in the TSB 378, and permanent recordings can eventually be deleted from the disk space, typically at the explicit request of a user, as one example.

There is a duration associated with the TSB 378, which represents how much data is held by the TSB 378. This duration could represent, in one embodiment, actual media content instance time. The PVR application 377, in a time-duration embodiment, will preferably maintain a substantially constant buffer space capacity suitable for a certain duration of media content instance time, for example, 3–4 hours worth of media content instances. Media content instance-time tracking is related to hard disk space tracking if a constant data rate, or buffering rate, is assumed or estimated. In a preferred embodiment, the duration of the TSB 378 represents hard disk space. The PVR application 377 can set a buffer size capacity, for example 3 gigabytes (GB), and then track disk space used for the TSB 378 to ensure a substantially constant TSB capacity. For example, before the PVR application 377 effects a write to the storage device 373, it can query the device driver 311 (through the operating system 353) to determine the available hard disk space. After the write operation, the PVR application 377 again can poll the device driver 311 to get an update on available hard disk space.

The TSB 378 can be managed according to several mechanisms. In one embodiment, each media content instance that is received at the tuner 345 prompts the PVR application 377 to cause each media content instance to be downloaded to the hard disk 300 and designated as a media content instance file under a designated media content instance filename. The PVR application 377 so creates a management file that maintains a data record that includes the media content instance filename, as well as guide data that includes the scheduled start time and stop time of the downloaded media content instance. The receipt of the downloaded media content instance is also recorded by the PVR a application 377 (through coordination with the operating system 353 and an internal clock (not shown)) as a real-time value. The PVR application 377 is either alerted to the start of a media content instance, in one implementation, from a keypress event (e.g. when a user tunes to a channel). In another implementation, the PVR application can use a polling or timing mechanisms in cooperation with the internal real-time clock and guide data. The PVR application 377 provides the operating system 353 with the scheduled stop time (from guide data, such as from an interactive program guide) of the downloaded media content instance in order to set up a timer interrupt (or in other embodiments, polls the operating system 353) with the operating system 353. The operating system 353, in coordination with a real-time clock within the DHCT 16, alerts the PVR application 377 (FIG. 3A) to the end of the received media content instance. Further, the PVR application 377 preferably maintains a linked list of the management files that correspond to the media content instances located on the hard disk. Read requests for one of the downloaded media content instances in the TSB 378 occurs by the PVR application 377 searching the link list for the requested media content instance, and providing a graphics user interface (GUI) on a display screen based on the information maintained in the corresponding management file. Further information on pertaining to this embodiment for creating and maintaining the TSB 378 can be found in the application entitled, "CONTROLLING SUBSTANTIALLY CONSTANT BUFFER CAPACITY FOR PERSONAL VIDEO RECORDING WITH CONSISTENT USER INTERFACE OF AVAILABLE DISK SPACE," filed Dec. 6, 2001 under Ser. No. 10/010,270, "CONVERTING TIME-SHIFT BUFERING FOR PERSONAL VIDEO RECORDING INTO PERMANENT RECORDINGS," filed Dec. 6, 2001 under Ser. No. 10/008,624, and "DIVIDING AND MANAGING TIME-SHIFT BUFF RING INTO PROGRAM SPECIFIC SEGMENTS BASED ON DEFINED DURATIONS," filed Dec. 6, 2001 under Ser. No. 10/008, 439, all assigned to Scientific Atlanta, and all herein entire y incorporated by reference.

Another embodiment for maintaining and managing the TSB 378 includes allocating a single file for each TSB 378, and controlling the allocation and deallocation of disk space the device driver 311 level. In this embodiment, further described in patent applications entitled, "DISK DRIVER CLUSTER MANAGEMENT OF TIME SHIFT BUFFER WITH FILE ALLOCATION TABLE STRUCTURE," filed Dec. 5, 2001 under Ser. No. 10/005,628, and "APPLICATION MANAGEMENT AND INTERFACE FOR CLUSTER CONTROL OF TIME SHIFT BUFFER," filed Jan. 1, 20001 under Ser. No. 10/010,781, both assigned to Scientific Atlanta, and both herein entirely incorporated by reference, the PVR application 377 requests the allocation of disk space for a single file for each TSB 378. The device driver 311, as either a separate software module, or integrated with the operating system 353, allocates enough clusters to meet the size requirement designated by the PVR application 377. Media content instances downloaded to the TSB 378 are tracked by time, and not by file name as implemented in the first embodiment described above. The device driver 311 provides a software generated pointer, called Normal Play Time (NPT), which points to locations within files and locations within media content instances within those files. Based on the Lightweight Stream Control P Protocol, NPT can be thought of as the clock associated with a video asset (as distinguished from the real-time clock (not shown) for the DHCT 16).

For every file that is created for media content downloaded to the storage device 373, an NPT is generated. There is an NPT for the read head of the storage device 373 and for the write head of the storage device 373. For writing content to the storage device 373 for a newly created file (e.g. a TSB file), an NPT is created for the write head of the storage device 373 with an initial value of zero. In one implementation, the device driver 311 receives a periodic interrupt (for example every 5–10 msec) set up by the PVR application 377 through the computer services of the operating system 353. This interrupt is synchronized with the internal real-time clock (not shown) of the DHCT 16 in order to advance the pointer (i.e. the NPT) at a substantially constant rate. The NPT continues to increase in value (from an initial value of zero) until the associated file is closed. For the read head of the storage device 373, the NPT starts at 0 at the start of the file, advances in real time in normal play mode, advances faster than real time in fast forward mode, decrements in rewind mode, and is fixed when the video is paused.

The PVR application 377 maintains a data structure for every downloaded media content instance. This data structure is preferably maintained on the hard disk 300 of the storage device 373. The data structure includes the NPT values defining the start and end times of the downloaded media content instance, the real-time values corresponding to the start and end times of the media content instances, as well as the corresponding media content instance guide data, among other things. Other embodiments can track and/or display less than the aforementioned information. The device driver 311 maintains the mapping between NPT and the cluster/sector locations of media content in a separate look-up table data structure (not shown) located on the hard disk 300. In one embodiment, the device driver 311 can sample the current write location (i.e. cluster and sector location provided by the storage device controller 379) as the write head of the storage device 373 (FIG. 3A) advances and store that cluster and sector location in the look-up table data structure along with a corresponding NPT value. This sampling can occur, for example, every 5–10 msec. In an alternative embodiment, the device driver 311 can record an initial sample and through an interpolation algorithm (e.g. interpolating from a subsequent write sample) estimate file locations and locations within said files. When the PVR application 377 (FIG. 3A) references a particular media content instance (for example where a user seeks to rewind to a downloaded media content instance in the hard disk 300), the PVR application 377 passes the stored start and stop NPT values for that media content instance to the device driver 311, and the device driver 311 determines the hard disk locations from the look-up table data structure. The PVR application 377 correlates NPT read values for locations within the media content instances to the real-time clock value. With the real-time start and stop values and guide data maintained in a data structure, as well as the correlated read-NPT to real-time values, the PVR application 377 can produce a GUI that provides the user with information that includes what portion of a buffered media content instance the user is currently viewing.

Figure 3C:
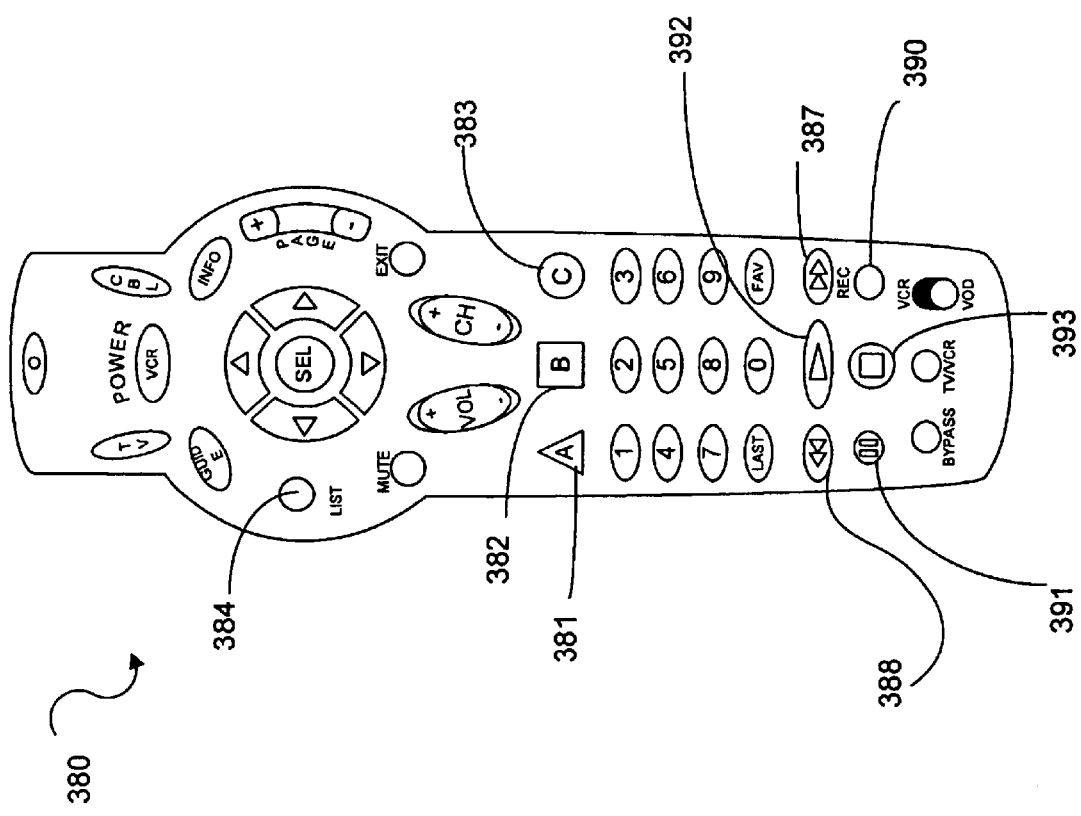
FIG. 3C is a diagram of an example remote control device to provide input to the DHCT 16 illustrated in FIG. 3A, in accordance with one embodiment of the invention.

As described above, the user preferably permanently records from the TSB 378 by designating as permanent a currently viewed media content instance during real-time viewing or returning (e.g. rewinding) to any part of a media content instance in the TSB 378 and selecting the record button (described below) from a remote device 380, or alternatively, from selecting record on the DHCT 16. An example remote control device 380 to provide input to the DHCT 16 is illustrated in FIG. 3C. Rewind 388 and fast-forward 387 buttons enable a user to access buffered media content instances in the TSB 378. Record button 390 enables the user to designate as permanently recorded any media content instance buffered into the TSB 378, as described below. Pause button 391 or the stop button 393 enables the user to pause a media content instance, or pause during a search for a particular media content instance. Playback 392 enables the playback of a media content instance. "A" 381, "B" 382, and "C" 383 buttons can correspond to certain application-defined functions that have a corresponding "A", "B", or "C" symbol displayed in a GUI presented on a display device. List button 384 can be used to evoke various PVR application 377 user interface screens. Many alternative methods of providing user input may be used including a remote control device with different buttons and/or button layouts, a keyboard device, a voice activated device, etc. The embodiments of the invention described herein are not limited by the type of device used to provide user input.

Figure 4:
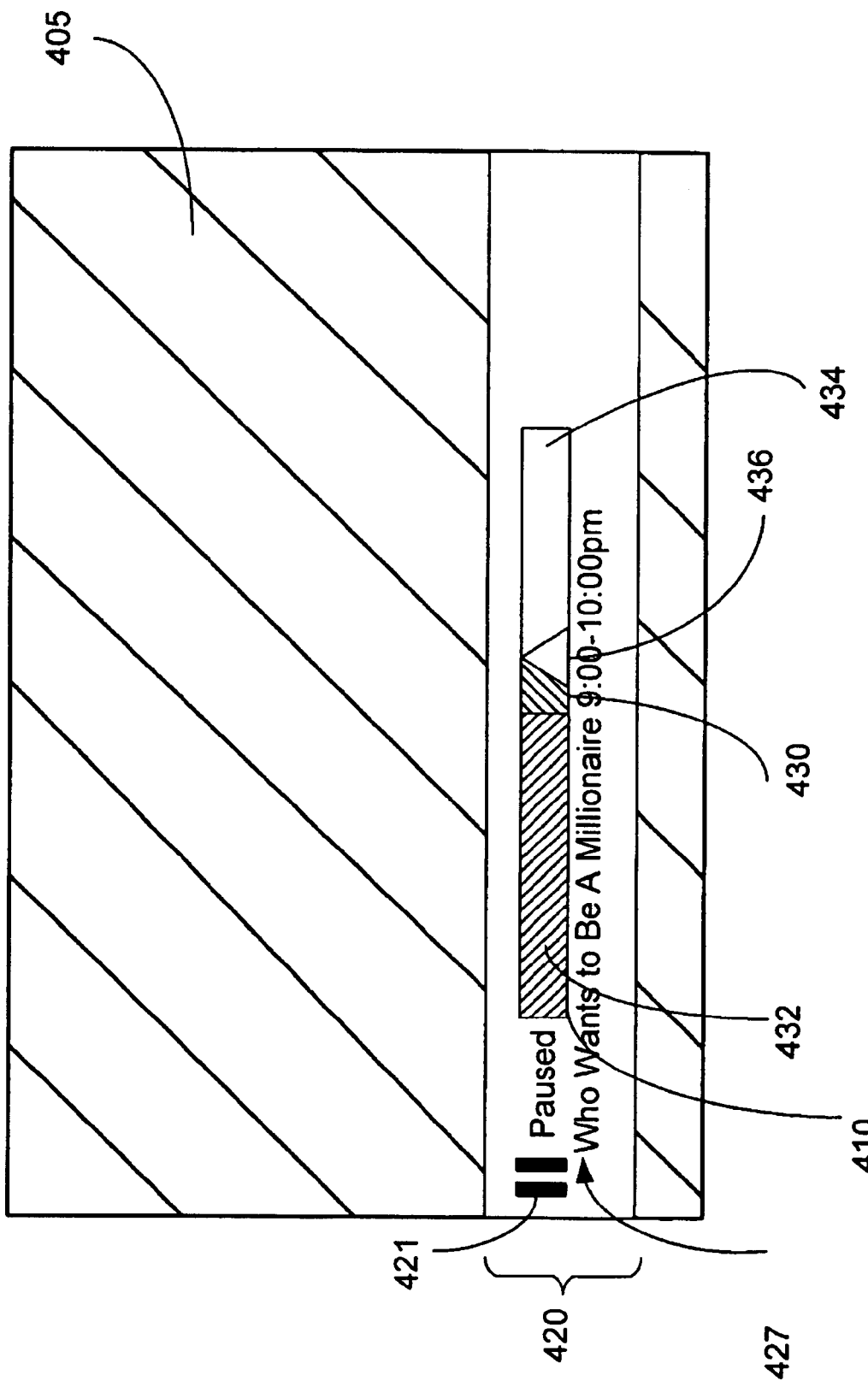
FIG. 4 is a screen diagram of an example graphic user interface (GUI) screen display depicting a progress bar for a first media content instance buffered into the time shift buffer, paused two minutes after the midway point through the media content instance, in accordance with one embodiment of the invention.

The PVR application 377 provides a GUI that assists the user in navigating to, and between, buffered media content instances. Specifically, the GUI includes a progress bar that is a representation of the user's current position in a buffered media content instance (e.g. TV show) relative to the currently tuned media content instance. Each buffered media content instance duration is represented by the progress bar preferably displayed on the bottom of the screen. Thus, the progress bar indicates the media content instance time boundaries, and is labeled with the media content instance information, as will be described below. The progress bar can be evoked by pressing the pause button 391 on the remote control device 380 (FIG. 3C). The PVR application 377 recognizes this keypress event and subsequently, in cooperation with the operating system 353, causes the current picture frame to "freeze". Further, the PVR application generates the GUI that includes the "progress bar", based largely on the data maintained in a data structure maintained by the PVR application 377, as described above. In other embodiments, the controlling application (i.e. providing the real-time media content) can include PVR functionality. FIG. 4 is a screen diagram of an example GUI screen display depicting a progress bar for a media content instance buffered into the time shift buffer, paused two minutes after the midway point through the media content instance, in accordance with one embodiment of the invention. Assume the user also turned on the TV for the first time two minutes ago. A pause banner 420 and progress bar 410 are overlaid on top of a display of a media content instance. The media content instance display area is depicted as closely hashed lines 405. Pause banner 420 includes pause icon 421. Title portion 427 includes the title of the buffered media content instance associated with the current progress bar 410 and the scheduled media content instance start and end time (from PVR application maintained data structures). The progress bar 410 shows progression, in terms of buffer space, through a media content instance as the viewer moves, or navigates, through it. As shown here, the progress bar is media content instance specific. That is, the length of the progress bar, although having a substantially constant graphic length among displayed media content instances, portions of the progress bar provide a display that is proportional to the duration of the media content instance, as well as representative of the viewed locations within the media content instance. The progress bar in this example illustrates an accessible portion 430, an inaccessible portion 432, a remaining portion 434, and a status arrow 436. Each of these elements can include distinguishing characteristics, for instance various hatching, shades, but preferably, include different colors and shades for each. Although preferred embodiments for the colors of the various elements of the progress bar will be described herein, other colors for the elements can be used as will be appreciated by one having ordinary skill in the art. The accessible portion 430 is preferably green (that is, green pixels). Accessible portion 430 indicates what portion of the current media content instance is available for rewinding and fast forwarding. Accessible portion 430 also represents when the media content instance displayed was tuned to and buffered into the TSB 378 (FIG. 3A). As indicated above, this example assumes the user turned the TV on and tuned into the media content instance two minutes ago, which occurred midway through the media content instance. Assume the media content instance is an episode of Who Wants To Be a Millionaire. Thus, the user will be able to rewind back to when he or she tuned into Who Wants To Be a Millionaire (which was two minutes ago). Accessible portion 430 starts midway through the progress bar 410, corresponding to being midway into Who Wants To Be a Millionaire. The inaccessible portion 432, preferably colored red, indicates what portion of the current media content instance is unavailable for rewinding and fast forwarding. As the user first tuned to Who Wants To Be a Millionaire midway through the presentation, the portion of Who Wants To Be a Millionaire represented by the inaccessible portion 432 was not downloaded to the TSB 378 and thus is unavailable for viewing. Status arrow 436, preferably yellow, indicates the currently viewed position in the buffered media content instance, which in this example, the user has paused midway into the media content instance plus two minutes. Remaining portion 434 represents that Who Wants To Be a Millionaire is still in progress, and thus, has not been completely buffered into the TSB 378. Remaining portion 434 is preferably the background color of the pause banner 421. The color of the background (and thus the color of the remaining portion 434) can be configured by the user in a general settings menu (not shown).

Figure 5:
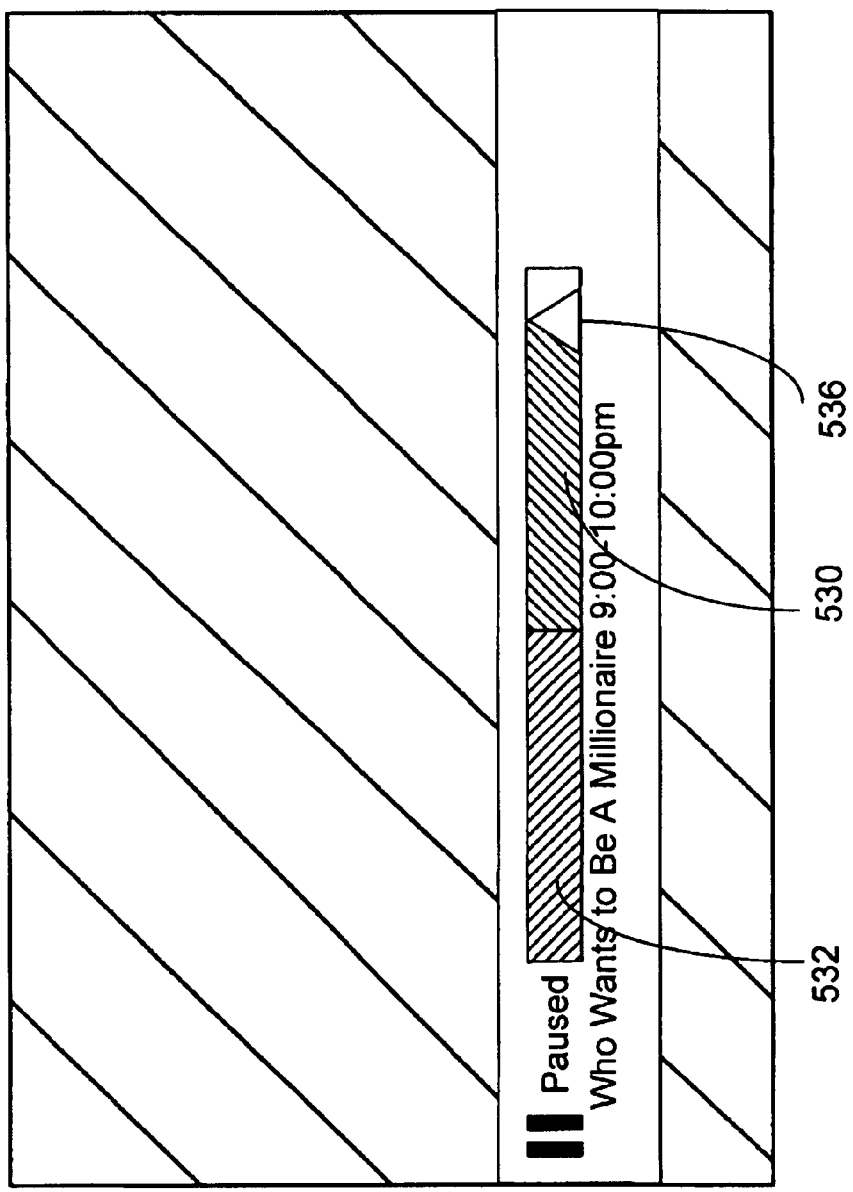
FIG. 5 is a screen diagram of an example GUI screen display depicting the progress bar for the first media content instance of FIG. 4 buffered into the time shift buffer, paused two minutes before the end of the media content instance, in accordance with one embodiment of the invention.

FIG. 5 is a screen diagram of an example GUI screen display depicting the progress bar for the media content instance of FIG. 4 buffered into the time shift buffer, paused two minutes before the end of the media content instance, in accordance with one embodiment of the invention. As shown, accessible portion 530 represents that the user can rewind from the currently viewed position indicated by status arrow 536, back to when the user tuned into the media content instance midway through the media content instance (as indicated by the boundary between the accessible portion 530 and the inaccessible portion 532). Note that the displayed position of the status arrow 536 reveals that the user in this example is viewing the downloaded media content instance (Who Wants To Be a Millionaire) in real-time as it is being buffered.

Figure 6:
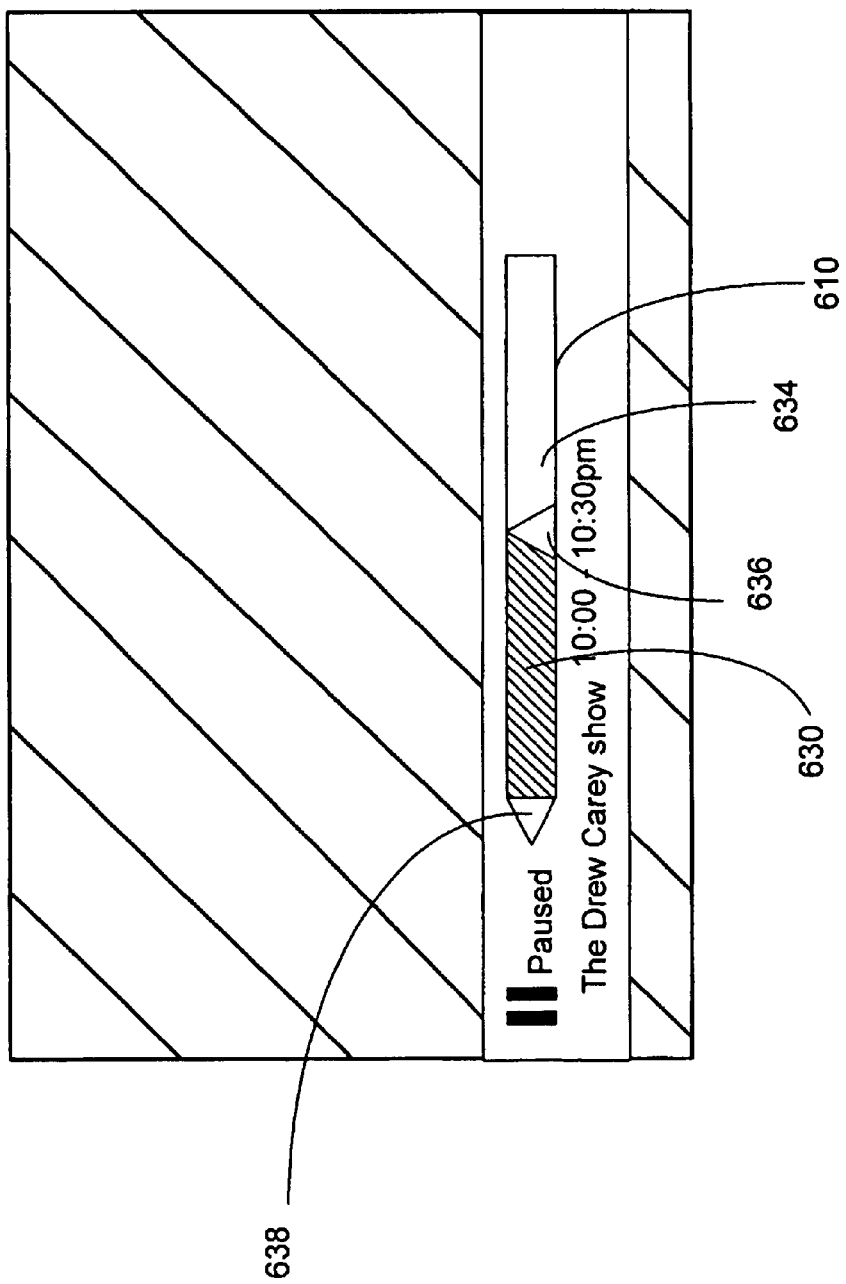
FIG. 6 is a screen diagram of an example GUI screen display depicting the progress bar for a second media content instance buffered into the time shift buffer after the first media content instance of FIG. 5, paused midway into the presentation, in accordance with one embodiment of the invention.

FIG. 6 is an example screen diagram illustrating the progress bar 610 where the user has paused 15 minutes past the start of the next downloaded media content instance, The Drew Carey Show. Note an additional element to the progress bar 610 is the bar arrow 638 on the left hand side of the progress bar 610. The bar arrow 638 represents that there exists a buffered media content instance before the Drew Carey Show (i.e. Who Wants To Be a Millionaire). The current live point (currently tuned location) is indicated by the boundary of the accessible portion 630 and the remaining portion 634. The time of 15 minutes is midway through the duration of the scheduled duration for the Drew Carey Show, and thus for this real-time viewing example, the status arrow 636 and the boundary of the accessible portion 630 and the remaining portion 634 all coincide.

Figure 7:
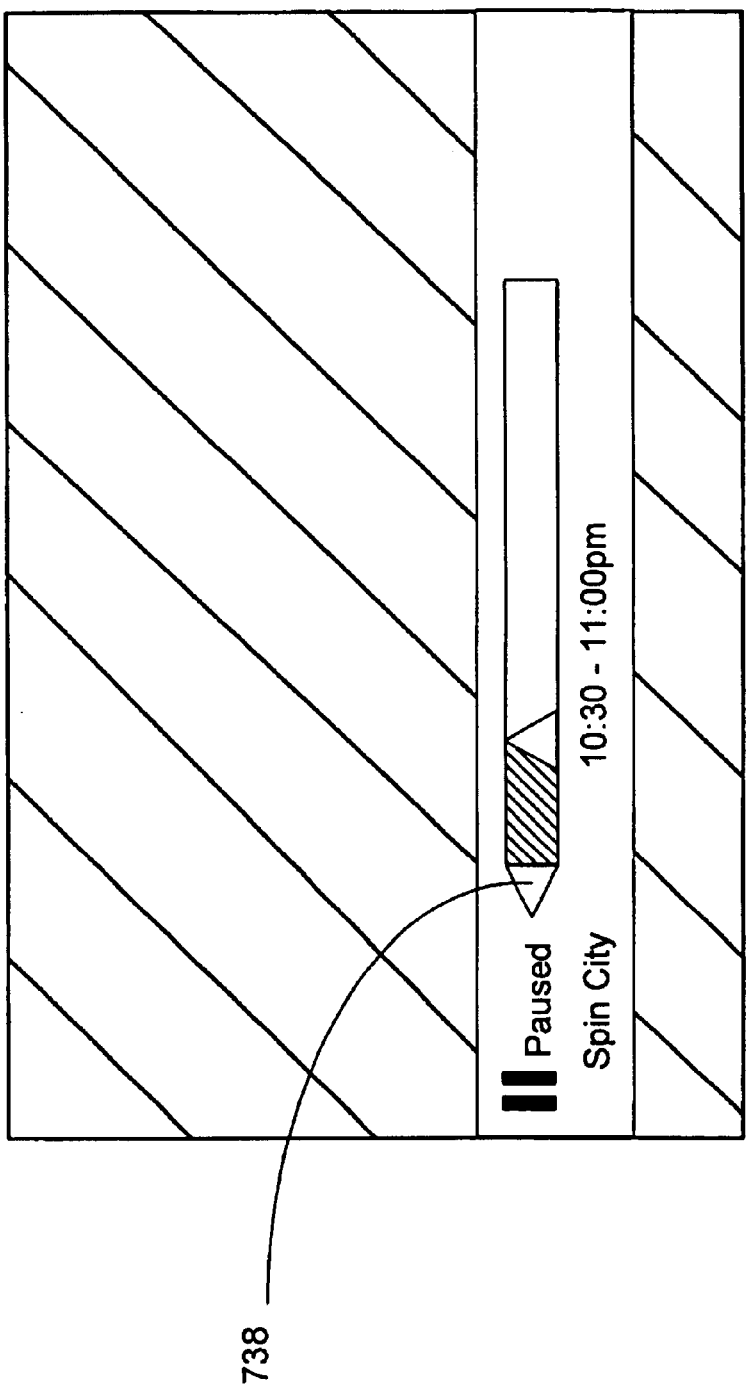
FIG. 7 is a screen diagram of an example GUI screen display depicting the progress bar for a third media content instance buffered into the time shift buffer after the second media content instance of FIG. 6, paused 10 minutes into the presentation, in accordance with one embodiment of the invention.

FIG. 7 is another example screen diagram where the user has paused 10 minutes into the media content instance following the Drew Carey Show (i.e. Spin City). Again, there is no bar arrow to the right hand side, but there is a bar arrow 738 to the left hand side indicating the existence of buffered media content (namely, the Drew Carey Show and Who Wants To Be a Millionaire).

Figure 8:
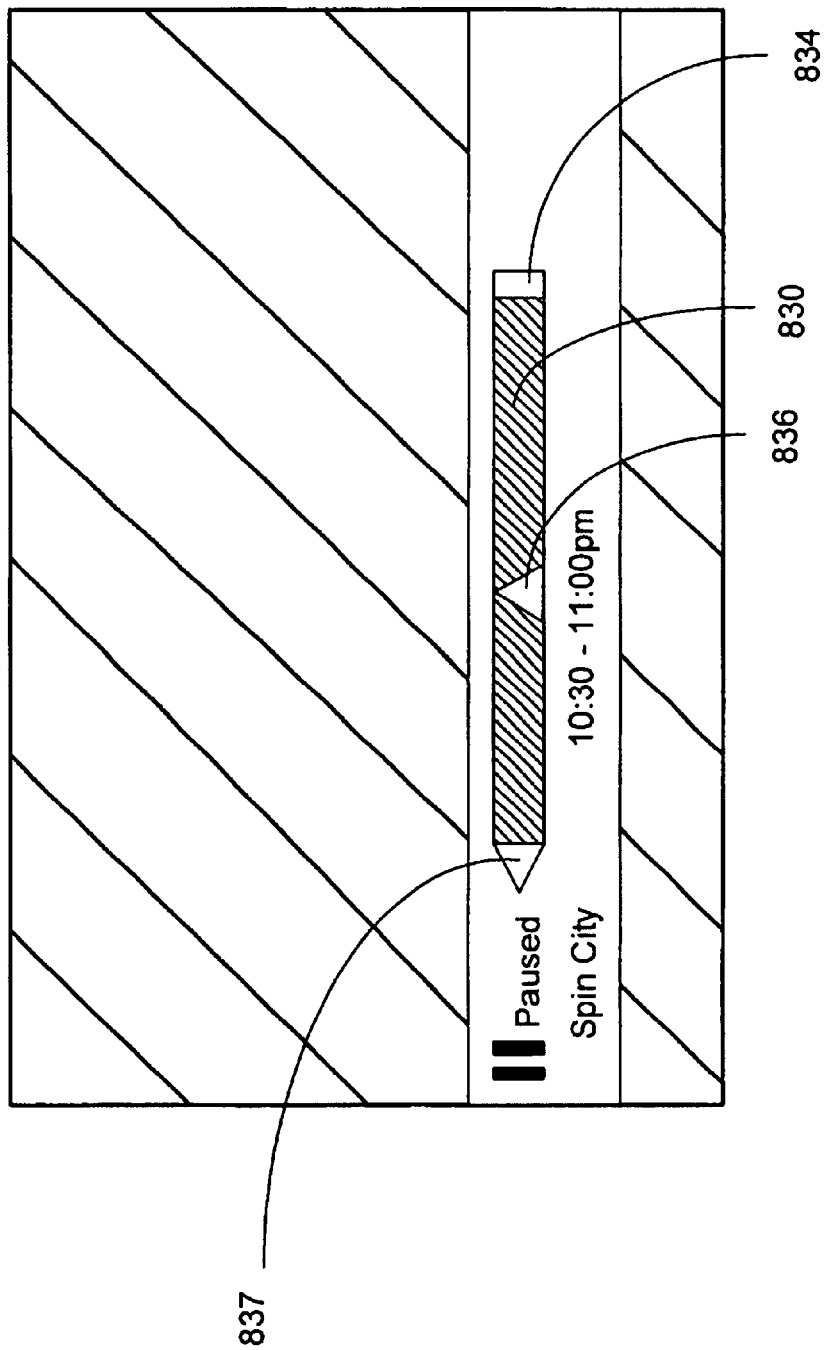
FIG. 8 is a screen diagram of an example GUI screen display depicting a progress bar for the third media content instance of FIG. 7 after rewinding from before the end of the presentation, in accordance with one embodiment of the invention.
Figure 9:
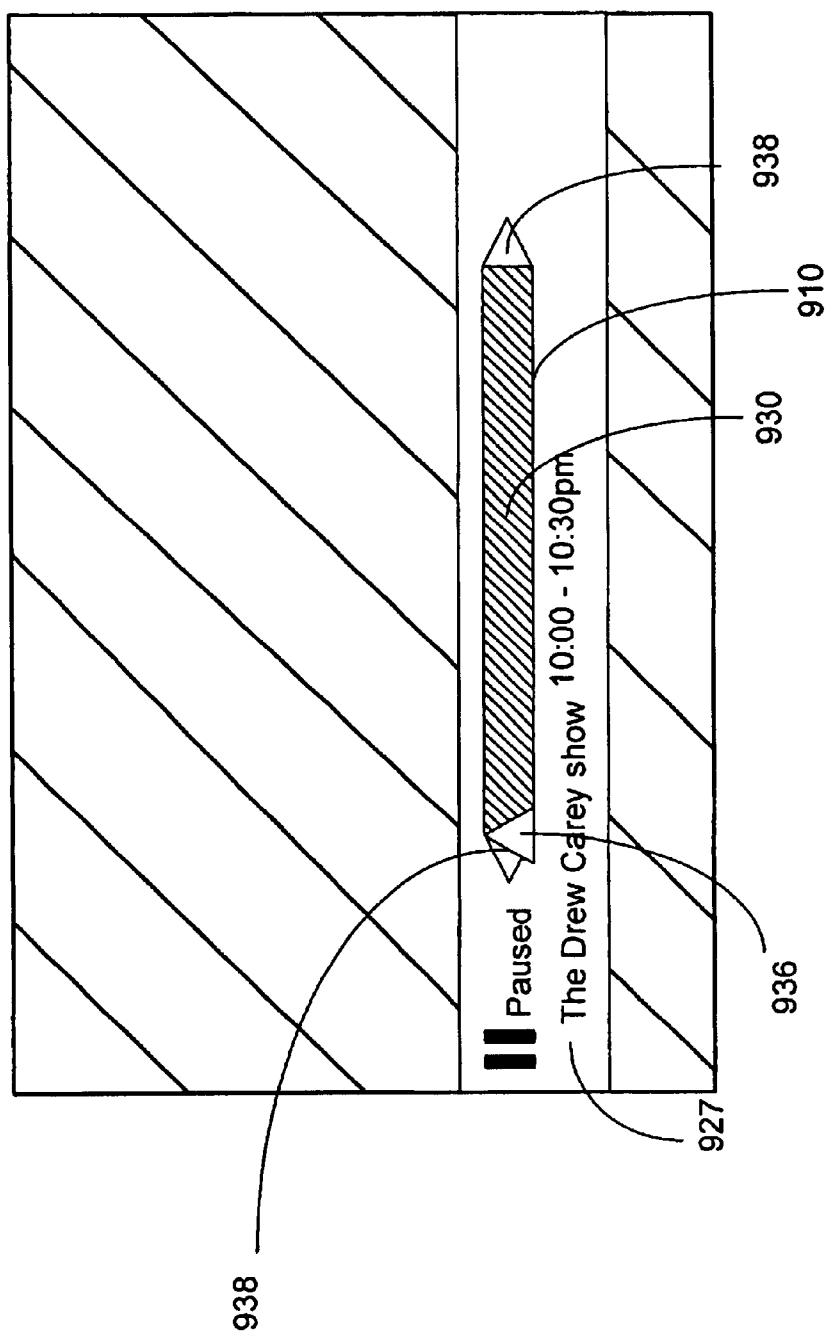
FIG. 9 is a screen diagram of an example GUI screen display depicting the progress bar for the second media content instance of FIG. 6 buffered into the time shift buffer after rewinding it 30 minutes or the whole media content instance length, in accordance with one embodiment of the invention.
Figure 10:
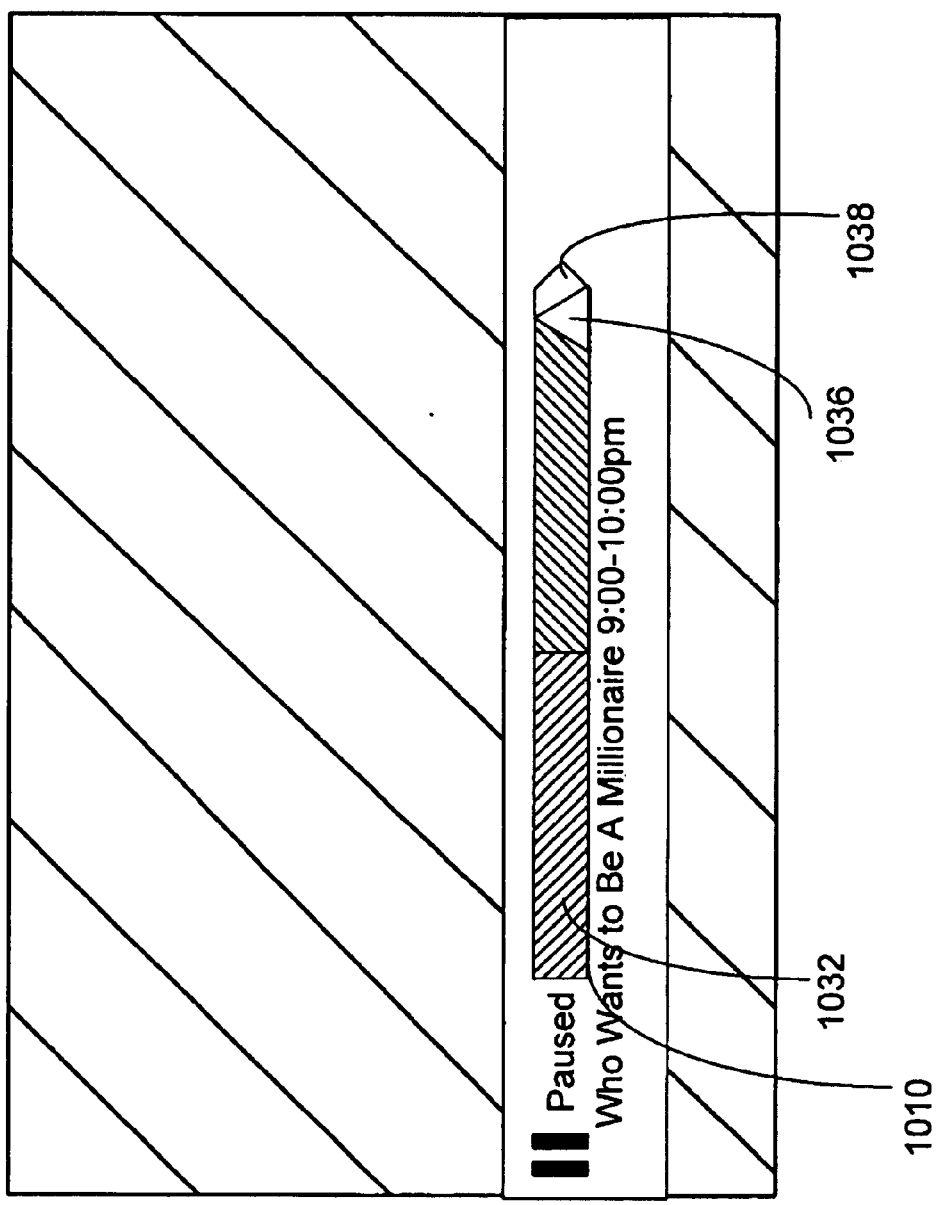
FIG. 10 is a screen diagram of an example GUI screen display depicting the progress bar for the first media content instance of FIGS. 4 and 5 where no rewinding of this media content instance has occurred, in accordance with one embodiment of the invention.

FIGS. 8–10 are screen diagrams that depict a rewind progression through the three media content instances of the TSB 378 depicted in FIGS. 4–7. During rewind (or fast forward as well) through the TSB 378, one or more media content instances can be available, in whole or in part, for playback or permanent recording depending on the length of time the channel was tuned. FIG. 8 is an example screen display of the most recently tuned media content instance (Spin City) after rewinding approximately 15 minutes from almost the end of the show, and then pausing. Status arrow 836 suggests to the user that he or she has rewound approximately midway through the buffered media content instance, Spin City. In other words, if the user had entered into the room approximately midway during the real-time presentation of Spin City, the screen display would show the same Spin City "snap-shot", or frame, as it does now (without the pause banner, assuming the user has not invoked the pause banner at that time). Bar arrow 837 represents that there are more buffered media content instances available. The bar arrow 837 suggests that these other buffered media content instances can be accessed by, for example, rewinding to them. The accessible portion 830 indicates the amount of the current media content instance that is buffered (i.e. written to the TSB 378, FIG. 3A). Thus, the accessible portion 830 provides the user with an indication as to what portion of the current media content instance is available for rewinding and fast-forwarding. The remaining portion 834 indicates that the media content instance is not over. If the user wants to designate Spin City as a permanent recording, the user preferably selects the record button 390 on the remote device 380 (FIG. 3C).

The next example screen display, as depicted in FIG. 9, is of a display of a media content instance buffered into the TSB 378 before the most recent one (FIG. 8) and after rewinding it 30 minutes or the whole media content instance length. As noted by the scheduled presentation time included in the title portion 927 and the status arrow 936, the user has rewound to approximately the beginning of The Drew Carey Show. The accessible portion 930 indicates that the entire The Drew Carey Show was buffered into the TSB 378. Bar arrows 938 on each end of the progress bar 910 suggest to the user that there are buffered media content instances accessible before and after The Drew Carey Show. To designate The Drew Carey Show as a permanent recording, the user preferably selects the record button 390 on the remote control device 380 (FIG. 3C) at any point within the Drew Carey Show.

The next example screen display depicted in FIG. 10 is of the display of Who Wants To Be A Millionaire which was downloaded before the Drew Carey Show as discussed in association with FIG. 9. No rewinding of this media content instance has occurred yet, as indicated by status arrow 1036. Note that the progress bar 1010 shows only one bar arrow 1038 on the right hand side, illustrating the fact that there are no other media content instances buffered in the TSB 378 before Who Wants To Be A Millionaire, as discussed above.

As an alternative to rewinding to the media content instance in the TSB 378 desired for designation as a permanent recording, another GUI may be presented on the screen that lists the media content instances currently in the TSB 378, with a mechanism to select which of these media content instances the user desires to permanently record (i.e. make permanent, not part of the TSB 378). The list of media content instances can be ascertained from the media content instance guide data.

Figure 11:
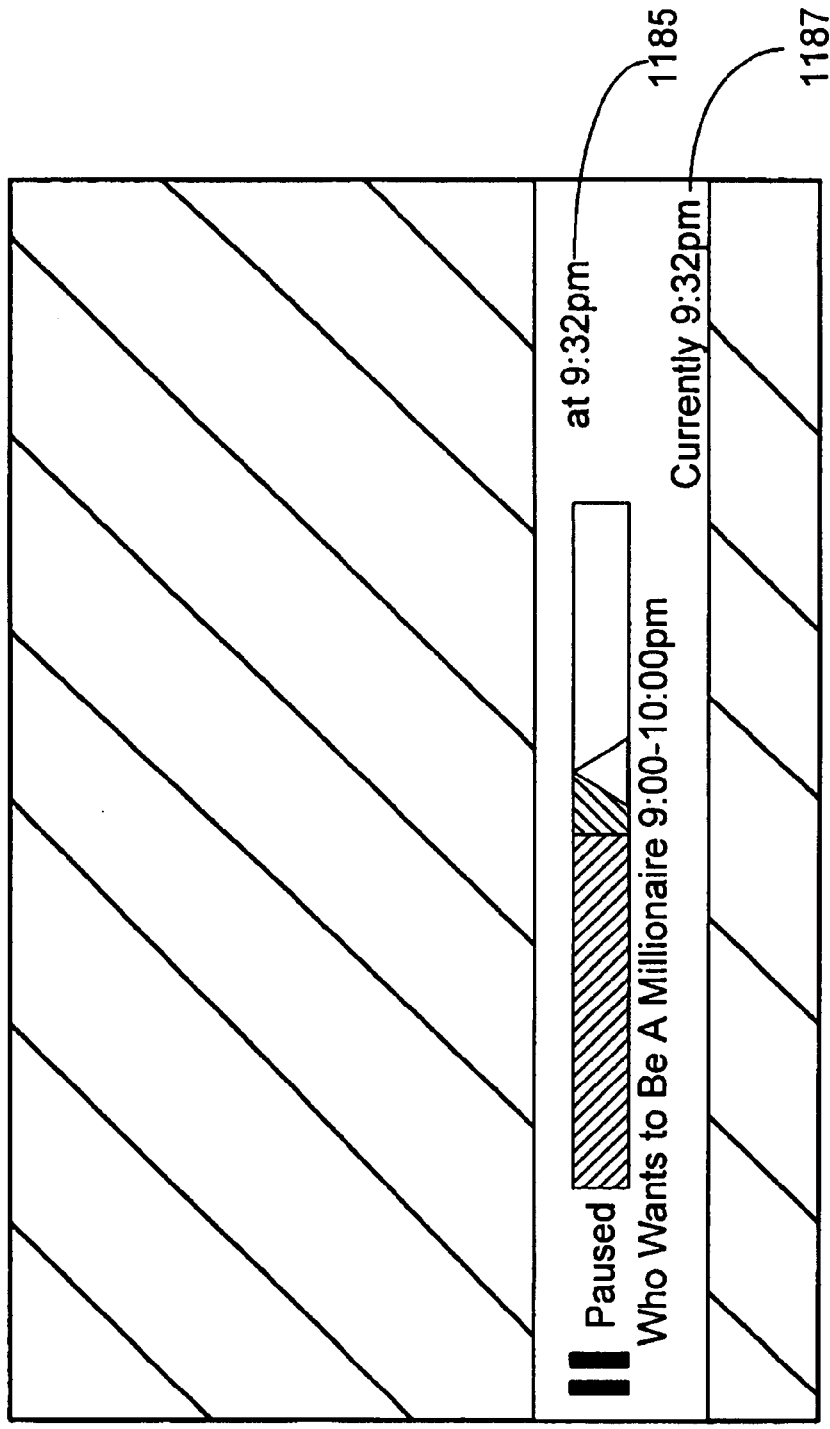
FIG. 11 is a screen diagram of example GUI screen display depicting the progress bar for the first media content instance of FIG. 4 and modified to include clock displays, in accordance with one alternate embodiment of the invention.

Further, the GUI's of FIGS. 4–10 can also be configured with clock displays, such as time status 1185 and current time 1187 as shown in the example screen display of FIG. 11. As shown, the screen display of FIG. 4 has been modified to include the clock displays. Time status 1185 can be used to indicate the "relate time" within the buffered media content instance as the time would have appeared to the user during the real-time presentation. Current time 1187 indicates the current time of day. The time-status clock display FIGS. preferably presents an estimated time based on a specified average bit rate. The PVR application 377 (FIG. 3A) can provide for a default value for the bit rate which equates to the average bit rate for most media content instances. In other embodiments, the bit rate can be estimated, and in other embodiments, the PVR application 377 can use the combination of a default value and an estimated value based on monitoring the disk space consumed for downloaded media content. Still in other embodiments, the user can be presented with a screen display that configures the bit rate based on a selectable list of quality settings (e.g. low, medium, or high quality settings) that the PVR application can adjust to.

Figure 12:
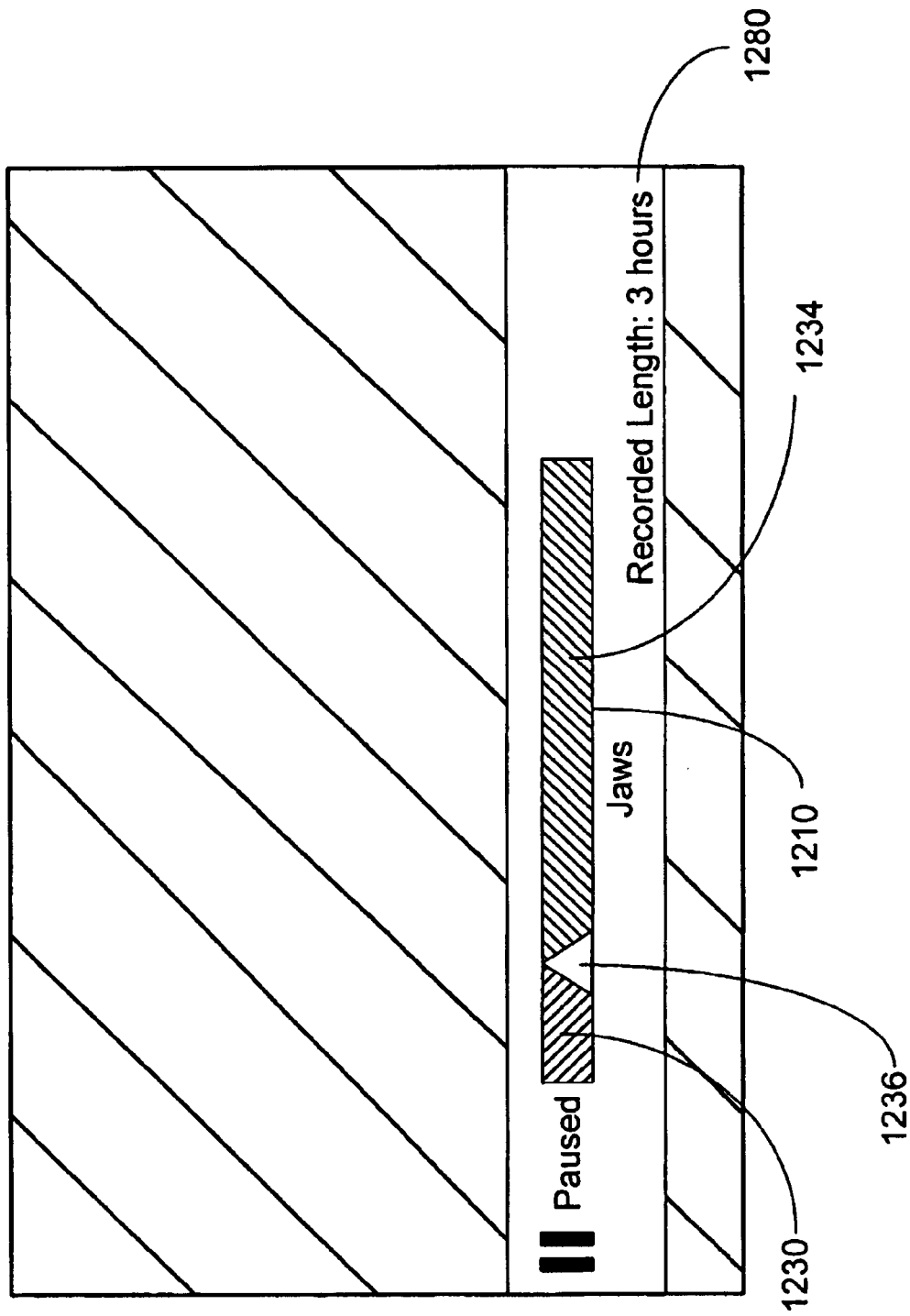
FIG. 12 is a screen diagram of example GUI screen display depicting a playback progress bar for a permanently recorded media content instance, in accordance with one alternate embodiment of the invention.

Further, it will be appreciated by one having ordinary skill in the art that the progress bar, or variations of the progress bar, can be used to assist the user in navigating through other recorded media content, such as permanent recorded media content. A similar data structure to that used for supporting the user interface screens of the buffered media content can be employed to support the playback of permanently recorded media content. FIG. 12 is a screen diagram of another embodiment of the progress bar for use in the playback of permanent recordings, overlaid on a display of a permanently recorded media content instance (e.g., Jaws) after selecting pause from the remote control device 380 (FIG. 3C). The difference between the playback progress bar 1210 and the time shift buffer progress bar illustrated in FIGS. 4–11 are due to the inherent nature of permanent recordings and buffered programs. For instance, with a permanent recording, the playback progress bar reflects the portions of media content that were indeed permanently recorded. Thus, the playback progress bar 1210 has no background portion. Further, the portions of the playback progress bar 1210 will suggest to the user recorded and unrecorded (i.e. stored and non-stored) portions of the media content. Thus, the unrecorded portion 1230 will be fixed, and proportional to the portion of the media content that was not stored to the storage device (for example, where the user tuned into Jaws thirty minutes after the start of Jaws), and thus not available for playback. This portion 1230 is preferably red, but in other embodiments, can be any color. The recorded portion 1234, preferably green (although other colors can be used), provides a visual indication to the user what portion of the media content (e.g., Jaws) was permanently recorded to the storage device, and thus available for playback. The status arrow 1236 advances to the right (or left if rewound) as the user views the recorded portions of Jaws. The other difference due to the recorded nature of the content is that the scheduled presentation times of the title portion 427 (FIG. 4, for example) are replaced with the recorded length 1280 in the lower right hand side of the pause banner.

The PVR application 377 may be implemented to manage and maintain a substantially constant buffer space capacity (and in a large enough buffer space, a substantially constant buffer space) in the storage device 373, or in any memory-type device, such as RAM, DRAM, or related memory. Further, the scope of the preferred embodiment is not meant to be limited to downloads of content through cache transfers between the storage device 373 and system memory 349, but may include direct downloads to system memory 349 alone, or to the storage device 373 alone.

The PVR application 377 can be implemented in hardware, software, firmware, or a combination thereof. In the preferred embodiment(s), the PVR application 377 is implemented in software or firmware that is stored in a memory and that is executed by a suitable instruction execution system. If implemented in hardware, as in an alternative embodiment, the PVR application 377 may be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The PVR application 377, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It should be emphasized that the above-described embodiments of the present invention, particularly, any "preferred embodiments" are merely possible examples of implementations, merely setting forth a clear understanding of the principles of the inventions. Many variations and modifications may be made to the above-described embodiments of the invention without departing substantially from the spirit of the principles of the invention. All such modifications and variations are intended to be included herein within the scope of the disclosure and present invention and protected by the following claims.

Therefore, having thus described the invention, at least the following is claimed:

1. A method for providing information about media content stored in a storage device coupled to an interactive media services client device, the method comprising the steps of:

graphically providing a progress bar that represents the duration of one media content instance among a plurality of media content instances stored in the storage device;

graphically providing a recorded portion in the progress bar that represents a portion of the media content instance that has been recorded and is accessible to a user; and graphically providing an unrecorded portion in the progress bar that represents a portion of the media content instance that has not been recorded.

2. The method of claim 1, further comprising the step of providing a pointer in the progress bar that corresponds to a position in time relative to the entire playback time of a recorded scene of the media content instance currently presented on a display device.

3. The method of claim 2, wherein the pointer is a triangle that is colored yellow.

4. The method of claim 1, wherein the unrecorded portion corresponds to an inaccessible portion of the media content instance that precedes the recorded portion.

5. The method of claim 4, wherein the inacessible portion is colored red.

6. The method of claim 1, wherein the unrecorded portion corresponds to a portion of the media content instance subsequent to the recorded portion that is remaining to be downloaded into the storage device as time advances.

7. The method of claim 6, wherein the portion of the media content instance subsequent to the recorded portion is clear colored based on a user selected color from a user setting.

8. The method of claim 1, further comprising the step of providing an arrow that indicates when other media content instances are stored in the storage device, the arrow disposed at a location corresponding to at least one end of the progress bar, beyond which is indicative of a recording sequence with respect to the media content instance.

9. The method of claim 8, wherein the arrow points in the direction in time the user must navigate to find the other media content instances.

10. The method of claim 1, further comprising the step of providing a status clock that provides the user with an indication of what time in the media content instance the user is viewing had the user viewed the media content instance in real-time.

11. The method of claim 1, further comprising the step of providing a current time clock that provides the current time.

12. The method of claim 1, further comprising the step of providing a title for the media content instance along with the progress bar.

13. The method of claim 1, further comprising the step of providing a scheduled viewing time for the media content instance along with the progress bar.

14. The method of claim 1, further comprising the step of displaying the progress bar on a screen of a display device.

15. The method of claim 1, further comprising the step of overlaying the progress bar on a screen display of the media contents instance.

16. The method of claim 15, further comprising the step of presenting the progress bar in response to a command by the user, wherein the command is delivered from a remote control device.

17. The method of claim 1, wherein the recorded portion is colored green.

18. The method of claim 1, wherein the progress bar is presented with a pause banner, wherein the pause banner is overlaid on a display of the media content instance.

19. The method of claim 1, further comprising the step of providing the progress bar for each of the plurality of media content instances stored in the storage device.

20. The method of claim 1, further comprising the step of storing the media content in buffer space in the storage device.

21. The method of claim 1, further comprising the step of storing the media content in non-buffer space in the storage device.

22. The method of claim 1, further comprising the step of changing the area of the recorded portion as the media content instance is downloaded to the storage device, the changing area representing an increasing amount of the media content instance that is accessible by the user.

23. A method for providing information about media content stored in a storage device coupled to an interactive media services client device, the method comprising the steps of:

graphically representing a scheduled duration of a media content instance, among a plurality of media content instances stored in the storage device, with a progress bar;

graphically representing in the progress bar a portion of the media content instance that is accessible to a user with a first colored portion having an area that is proportional to the media content instance portions stored in the storage device;

graphically representing in the progress bar a portion of the media content instance that is inaccessible to the user with a second colored portion that is proportional to the media content instance portions that is not stored in the storage device;

graphically representing in the progress bar a portion of the media content instance that remains to be downloaded to the storage device with a third colored portion;

graphically representing in the progress bar the time location corresponding to what scene in the media content instance the user is current viewing with a pointer;

providing a current time that provides the current real-time;

providing a scheduled viewing time that provides the scheduled time of presentation for the media content instance;

providing a title of the media content instance;

providing a playback time that provides where in the schedule viewing time the user is currently viewing the media content instance;

representing in the progress bar where the user can go to find the plurality of media content instances with arrows; and overlaying the progress bar on the displayed media content instance.

24. A system for providing information about media content stored in a storage device coupled to an interactive media se ices client device, the system comprising:

a memory with logic; and a processor configured with the logic to graphically provide progress bar that represents the duration of at least one media content instance of a plurality of media content instances stored in the storage device, wherein the processor is further configured with the logic to graphically provide a recorded portion in the progress bar that represents a portion of the media content instance that has been recorded an is accessible to a user, wherein the processor is further configured with the logic to graphically provide an unrecorded portion in the progress bar that represents a portion of the media content instance that has not been recorded.

25. The system of claim 24, wherein the processor is further configured with the logic to provide a pointer in the progress bar that corresponds to a position in time relative to the entire playback time of a recorded scene of the media content instance.

26. The system of claim 25, wherein the pointer is a triangle that is colored yellow.

27. The system of claim 24, wherein the unrecorded portion corresponds to an inaccessible portion of the media content instance that precedes the recorded portion.

28. The system of claim 27, wherein the inaccessible portion is colored red.

29. The system of claim 24, wherein the unrecorded portion corresponds to a portion of the media content instance subsequent to the recorded portion that is remaining to be downloaded into the storage device as time advances.

30. The system of claim 29, wherein the portion of the media content instance subsequent to the recorded portion is clear colored based on a user selected color from a user setting.

31. The system of claim 24, wherein the processor is further configured with the logic to provide an arrow located on at least one side of the progress bar that indicates when other media content instances are stored in the storage device.

32. The system of claim 31, wherein the arrow points in the direction in time the user must navigate to find the other media content instances.

33. The system of claim 24, wherein the logic is further configured to provide a status clock that provides the user with an indication of what time in the media content instance the user is viewing if the user was viewing the media content instance in real-time.

34. The system of claim 24, wherein the processor is further configured with the logic to provide a current time clock that provides the current time.

35. The system of claim 24, wherein the processor is further configured with the logic to provide a title for the media content instance along with the progress bar.

36. The system of claim 24, wherein the processor is further configured with the logic to provide a scheduled viewing time for the media content instance along with the progress bar.

37. The system of claim 24, wherein the processor is further configured with the logic to display the progress bar on a screen of a display device.

38. The system of claim 24, wherein the processor is further configured with the logic to overlay the progress bar on the screen display of the media content instance.

39. The system of claim 24, wherein the processor is further configured with the logic to present the progress bar in response to a command by the user, wherein the processor is further configured with the logic to receive the command from a remote control device.

40. The system of claim 24, wherein the recorded portion is colored green.

41. The system of claim 24, wherein the processor is further configured with the logic to provide the progress bar with a pause banner, wherein the pause banner is overlaid on a display of the media content instance.

42. The system of claim 24, wherein the processor is further configured with the logic to provide the progress bar for each of the plurality of media content instances stored in the storage device.

43. The system of claim 24, wherein the processor is further configured with the logic to store the media content in buffer space in the storage device.

44. The system of claim 24, wherein the processor is further configured with the logic to store the media content in non-buffer space in the storage device.

45. The system of claim 24, wherein the processor is further configured with the logic to change the area of the recorded portion as the media content instance is downloaded to the storage device.

46. A method for providing information about media content stored in a storage device coupled to an interactive media services client device, the method comprising the steps of:

graphically providing a progress bar that represents the duration of one media content instance among a plurality of media content instances stored in the storage device;

graphically providing a recorded portion in the progress bar that represents a portion of the media content instance that has been recorded and is accessible to a user;

graphically providing a first unrecorded portion in the progress bar that corresponds to an inaccessible portion of the media content instance that precedes the recorded portion; and graphically providing a second unrecorded portion that corresponds to a portion of the media content instance subsequent to the recorded portion that is remaining to be downloaded into the storage device as time advances.

* * * * *